United States Patent
Hockin

(10) Patent No.: US 12,337,841 B2
(45) Date of Patent: Jun. 24, 2025

(54) SYSTEMS AND METHODS FOR VEHICLE REVERSING DETECTION USING EDGE MACHINE LEARNING

(71) Applicant: Geotab Inc., Oakville (CA)

(72) Inventor: Robert Spencer Hockin, Milton (CA)

(73) Assignee: Geotab Inc., Oakville (CA)

(*) Notice: Subject to any disclaimer, the term of this patent is extended or adjusted under 35 U.S.C. 154(b) by 258 days.

(21) Appl. No.: 18/094,571

(22) Filed: Jan. 9, 2023

(65) Prior Publication Data
US 2023/0222849 A1  Jul. 13, 2023

Related U.S. Application Data

(60) Provisional application No. 63/298,430, filed on Jan. 11, 2022.

(51) Int. Cl.
| | |
|---|---|
| *B60W 30/18* | (2012.01) |
| *B60W 40/105* | (2012.01) |
| *G06F 18/214* | (2023.01) |
| *G06N 20/00* | (2019.01) |
| *G07C 5/00* | (2006.01) |

(52) U.S. Cl.
CPC .... *B60W 30/18036* (2013.01); *B60W 40/105* (2013.01); *G06F 18/214* (2023.01); *G06N 20/00* (2019.01); *G07C 5/008* (2013.01); *B60W 2554/4044* (2020.02)

(58) Field of Classification Search
CPC .... B60W 30/18036; B60W 2554/4044; G07C 5/008
See application file for complete search history.

(56) References Cited

U.S. PATENT DOCUMENTS

| | | | |
|---|---|---|---|
| 6,490,616 B1 | 12/2002 | Maryka et al. | |
| 6,512,465 B2 | 1/2003 | Flick | |
| 6,741,187 B2 | 5/2004 | Flick | |
| 6,744,384 B2 | 6/2004 | Flick | |
| 6,756,885 B1 | 6/2004 | Flick | |
| 6,784,809 B2 | 8/2004 | Flick | |
| 6,798,356 B2 | 9/2004 | Flick | |

(Continued)

FOREIGN PATENT DOCUMENTS

| | | |
|---|---|---|
| TW | 1738475 A | 9/2021 |
| WO | 2023177391 A1 | 9/2023 |

OTHER PUBLICATIONS

Extended European Search Report dated Jun. 1, 2023 for Application No. 23150820.1.

(Continued)

*Primary Examiner* — Wade Miles
*Assistant Examiner* — Jerrod Irvin Davis
(74) *Attorney, Agent, or Firm* — Sherif A. Abdel-Kader

(57) ABSTRACT

Methods for reversing determination for a vehicle asset are provided. The methods include capturing by a telematics device coupled to the vehicle acceleration data from a three-axis accelerometer, determining by an edge reversing-determination machine learning mode, a machine-learning-determined reversing indication for the vehicle asset. The edge reversing-determination machine-learning model being updated based on a centralized reversing-determination machine-learning model trained using a vehicle-provided reversing indication.

19 Claims, 18 Drawing Sheets

(56) References Cited

U.S. PATENT DOCUMENTS

| | | |
|---|---|---|
| 6,803,861 B2 | 10/2004 | Flick |
| 6,888,495 B2 | 5/2005 | Flick |
| 6,957,133 B1 | 10/2005 | Hunt et al. |
| 6,972,667 B2 | 12/2005 | Flick |
| 7,257,396 B2 | 8/2007 | Olsen et al. |
| 7,647,147 B2 | 1/2010 | Fortin et al. |
| 7,671,727 B2 | 3/2010 | Flick |
| 8,032,278 B2 | 10/2011 | Flick |
| 8,744,700 B2 | 6/2014 | Beams |
| 9,754,426 B2 | 9/2017 | Meyer et al. |
| 9,886,800 B2 | 2/2018 | Groß |
| 10,255,575 B2 | 4/2019 | Warkentin et al. |
| 10,268,823 B2 | 4/2019 | Baker |
| 11,140,236 B2 | 10/2021 | Davis et al. |
| 11,310,069 B2 | 4/2022 | Xiao et al. |
| 11,320,826 B2 | 5/2022 | Vora et al. |
| 11,542,001 B1 | 1/2023 | Parodi et al. |
| 11,710,355 B1 | 7/2023 | Wenneman et al. |
| 11,736,312 B1 | 8/2023 | Xiao et al. |
| 11,741,760 B1 | 8/2023 | Dubin et al. |
| 11,756,346 B1 | 9/2023 | Wu et al. |
| 11,780,446 B1 | 10/2023 | Srinivasan et al. |
| 11,787,413 B2 | 10/2023 | Tsai et al. |
| 11,847,911 B2 | 12/2023 | Eihattab et al. |
| 2017/0030534 A1 | 2/2017 | Pan |
| 2017/0305349 A1 | 10/2017 | Naboulsi |
| 2018/0040173 A1 | 2/2018 | Davidson |
| 2018/0182182 A1 | 6/2018 | Meyer et al. |
| 2019/0158581 A1 | 5/2019 | Giannella et al. |
| 2020/0318321 A1 | 10/2020 | Kurokawa |
| 2020/0410853 A1 | 12/2020 | Akella |
| 2021/0214001 A1 | 7/2021 | Solomon |
| 2021/0221312 A1 | 7/2021 | Jenkins |
| 2021/0245659 A1 | 8/2021 | Golov |
| 2021/0291832 A1 | 9/2021 | Simmons |
| 2021/0319332 A1 * | 10/2021 | Isaac ............... G06N 20/00 |
| 2022/0001870 A1 | 1/2022 | Bunazawa |
| 2022/0004183 A1 | 1/2022 | Raeis Hosseiny |
| 2022/0014601 A1 | 1/2022 | Davis et al. |
| 2022/0044500 A1 | 2/2022 | Yang et al. |
| 2022/0066441 A1 | 3/2022 | Tan |
| 2022/0066442 A1 | 3/2022 | Hosseiny |
| 2022/0237958 A1 | 7/2022 | Tzamaloukas et al. |
| 2023/0171314 A1 | 6/2023 | Onti Srinivasan et al. |

OTHER PUBLICATIONS

Extended European Search Report dated Jun. 1, 2023 for Application No. 23150821.9.

* cited by examiner

SYSTEMS AND METHODS FOR VEHICLE REVERSING DETECTION USING EDGE MACHINE LEARNING

FIELD

The present disclosure relates generally to vehicle telematics, and more specifically to systems and methods for vehicle reversing detection using edge machine learning.

BACKGROUND

A telematics system may gather asset data using a telematics device. The telematics device may be integrated into or located onboard the asset. The asset may be a vehicle ("vehicular asset") or some stationary equipment. The telematics device may collect the asset data from the asset through a data connection with the asset. In the case of a vehicular asset, the telematics device may gather the asset data through an onboard diagnostic port. The gathered asset data may include engine revolutions-per-minute (RPM), battery voltage, fuel level, tire pressure, oil temperature, or any other asset data available through the diagnostic port. Additionally, the telematics device may gather sensor data pertaining to the asset via sensors on the telematics device. For example, the telematics device may have temperature and pressure sensors, inertial measurement units (IMU), optical sensors, and the like. Furthermore, the telematics device may gather location data pertaining to the asset from a location module on the telematics device. When the telematics device is coupled to the asset, the gathered sensor data and location data pertain to the asset. The gathered asset data, sensor data and location data may be received and recorded by a technical infrastructure of the telematics system, such as a telematics server, and used in the provision of fleet management tools, for telematics services, or for further data analysis.

SUMMARY

In one aspect of the present disclosure, there is provided a method. The method comprises receiving at a telematics server training acceleration data from a first telematics device coupled to a first vehicle, and a vehicle-provided reversing indication from the first telematics device. The method further comprises training by the telematics server a central reversing determination machine-learning model using the training acceleration data and the vehicle-provided reversing indication, generating sending by the telematics server a reversing determination model update to a second telematics device coupled to a second vehicle which does not provide a reverse gear indication, updating by the second telematics device an edge reversing determination machine-learning model using the reversing determination model update, capturing by the second telematics device captured acceleration data for the second vehicle, and determining, by the edge reversing determination machine-learning model a machine-learning-determined reversing indication for the second vehicle based on the captured acceleration data.

The method may further comprise generating an alert of a reversing event at the second telematics device in response to determining the machine-learning-determined reversing indication.

The vehicle-provided reversing indication may comprise a vehicle speed provided by the first vehicle to the first telematics device that is greater than about zero, and a reverse gear indication provided by the first vehicle to the first telematics device.

The captured acceleration data may be captured from a three-axis accelerometer installed in the second telematics device.

Sending the reversing determination model update to the second telematics device may be done periodically.

Sending the reversing determination model update to the second telematics device may be done in response to an improvement in an output confidence level of the central reversing determination machine-learning model.

Sending the reversing determination model update to the second telematics device is done in response to an update request from the second telematics device.

Capturing the captured acceleration data may be done in response to a synchronous event.

Capturing the captured acceleration data may comprise copying sampled accelerometer readings from accelerometer First-In-First-Out buffers after the synchronous event.

Capturing the captured acceleration data comprises copying sampled accelerometer readings from accelerometer First-In-First-Out buffers prior to the synchronous event.

The method may further comprise capturing, at the first telematics device, the training acceleration data from a three-axis accelerometer installed in the first telematics device.

Capturing the training acceleration data may be in response to a trigger event.

Capturing the training acceleration data may comprise capturing post-trigger event acceleration data.

Capturing the training acceleration data may comprise capturing pre-trigger event acceleration data and post-trigger event acceleration data.

Capturing pre-trigger event acceleration data may comprise copying sampled accelerometer readings from accelerometer First-In-First-Out buffers prior to the trigger event.

Capturing post-trigger event acceleration data may comprise copying sampled accelerometer readings from accelerometer First-In-First-Out buffers after the trigger event and before an expiry of a post-trigger duration timer.

The trigger event may comprise the vehicle-provided reversing indication.

The method may further comprise logging, by the telematics server, the machine-learning-determined reversing indication for the second vehicle in a telematics database coupled to the telematics server.

The method may further comprise sending, by the second telematics device, the machine-learning-determined reversing indication for the second vehicle to the telematics server.

The method may further comprise generating an alert by the first telematics device, in response to receiving the machine-learning-determined reversing indication for the first vehicle.

In another aspect of the present disclosure, there is provided a method by a telematics device coupled to a vehicle asset. The method includes training an edge reversing determination machine-learning model on the telematics device using a reversing determination model update received from a central reversing determination machine-learning model; obtaining captured acceleration data from a three-axis accelerometer of the telematics device; and determining a machine-learning-determined reversing indication from the captured acceleration data using the edge reversing determination machine-learning model.

The method further comprises generating an alert in response to the machine-learning-determined reversing indication.

The method further comprises sending the machine-learning-determined reversing indication to a telematics server.

In yet another aspect of the present disclosure, there is provided a telematics system. The telematics system comprises and a telematics server running a central reversing determination machine-learning model, a network, a first telematics device coupled to a first vehicle and in communication with the telematics server over the network, and a second telematics device coupled to a second vehicle which does not provide a reverse gear indication over the network. The telematics server receives training acceleration data and a vehicle-provided reversing indication from the first telematics device. The telematics server generates and sends a reversing determination model update to the second telematics device. The second telematics device updates an edge reversing determination machine-learning model using the reversing determination model update. The second telematics device captures captured acceleration data for the second vehicle. the edge reversing determination machine-learning model determines a machine-learning-determined reversing indication for the second vehicle based on the captured acceleration data.

BRIEF DESCRIPTION OF THE DRAWINGS

Exemplary non-limiting embodiments of the present invention are described with reference to the accompanying drawings in which.

DETAILED DESCRIPTION

Telematics System

Figure 1:
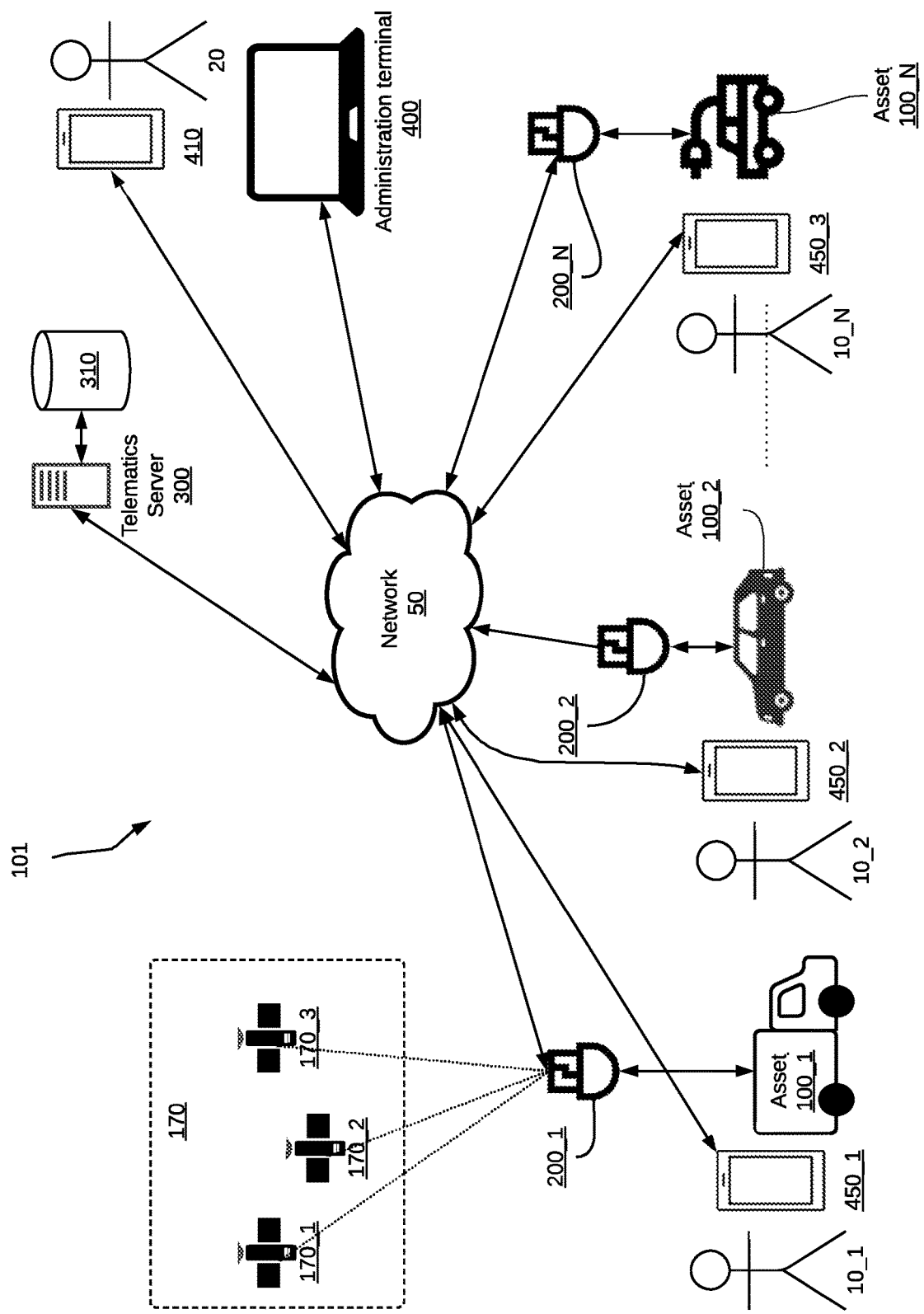
FIG. 1 is a schematic diagram of a telematics system including a plurality of telematics devices coupled to a plurality of assets.

A large telematics system may collect data from a high number of assets, either directly or through telematic devices. A telematics device may refer to a self-contained device installed at an asset, or a telematics device that is integrated into the asset itself. In either case, it may be said that telematics data is being captured or gathered by the telematics device. FIG. 1 shows a high-level block diagram of a telematics system 101. The telematics system 101 includes a telematics server 300, (N) telematics devices shown as telematics device 200_1, telematics device 200_2 . . . through telematics device 200_N ("telematics device 200"), a network 50, administration terminals 400_1 and 400_2, and operator terminals 450_1, 450_2 . . . through 450_N ("operator terminals 450"). FIG. 1 also shows a plurality of (N) assets named as asset 100_1, asset 100_2 . . . asset 100_N (collectively referred to as the asset 100) coupled to the telematics device 200_1, telematics device 200_2 . . . telematics device 200_N, respectively. Additionally, FIG. 1 shows a plurality of satellites 170_1, 170_2 and 170_3 ("satellites 170") in communication with the telematics devices 200 for facilitating navigation.

The assets 100 shown are in the form of vehicles. For example, the asset 100_1 is shown as a truck, which may be part of a fleet that delivers goods or provides services. The asset 100_2 is shown as a passenger car that typically runs on an internal combustion engine (ICE). The asset 100_3 is shown as an electric vehicle (EV). Other types of vehicles, which are not shown, are also contemplated in the various embodiments of the present disclosure, including but not limited to, farming vehicles, construction vehicles, military vehicles, and the like.

The telematics devices 200 are electronic devices which are coupled to assets 100 and configured to capture asset data from the assets 100. For example, in FIG. 1 the telematics device 200_1 is coupled to the asset 100_1. Similarly, the telematics device 200_2 is coupled to the asset 100_2 and the telematics device 200_3 is coupled to the asset 100_3. The components of a telematics device 200 are explained in further detail with reference to FIG. 2.

The network 50 may be a single network or a combination of networks such as a data cellular network, the Internet, and other network technologies. The network 50 may provide connectivity between the telematics devices 200 and the telematics server 300, between the administration terminal 400 and the telematics server 300, between the handheld administration terminal 410 and the telematics server 300, and between the operator terminals 450 and the telematics server 300.

The telematics server 300 is an electronic device executing machine-executable instructions which enable the telematics server 300 to store and analyze telematics data. The telematics server 300 may be a single computer system or a cluster of computers. The telematics server 300 may be running an operating system such as Linux, Windows, Unix, or any other equivalent operating system. Alternatively, the telematics server 300 may be a software component hosted on a cloud service, such as Amazon Web Service (AWS). The telematics server 300 is connected to the network 50, using a network interface thereof (not shown), and may receive telematics data from the telematics devices 200. The telematics server 300 may have a plurality of software modules for performing data analysis and analytics on the telematics data to obtain useful asset information about the assets 100. The telematics server 300 may have a telematics database 310 for storing telematics data and/or the results of the analytics which are related to the assets 100. The asset information stored may include operator information about the operators 10 corresponding to the assets. The telematics server 300 may communicate the asset and/or operator information pertaining to an asset 100 to one or more of: the administration terminal 400, the handheld administration terminal 410, and the operator terminal 450.

The satellites 170 may be part of a global navigation satellite system (GNSS) and may provide location information to the telematics devices 200. The location information may be processed by a location module on the telematics device 200 to provide location data indicating the location of the telematics device 200 (and hence the location of the asset 100 coupled thereto). A telematics device 200 that can periodically report an asset's location is often termed an "asset tracking device".

The administration terminal 400 is an electronic device, which may be used to connect to the telematics server 300 to retrieve data and analytics related to one or more assets 100. The administration terminal 400 may be a desktop computer, a laptop computer such as the administration terminal 400, a tablet (not shown), or a smartphone such as the handheld administration terminal 410. The administration terminal 400 may run a web browser or a custom application which allows retrieving data and analytics, pertaining to one or more assets 100, from the telematics server 300 via a web interface of the telematics server 300. The handheld administration terminal 410 may run a mobile application for communicating with the telematics server 300, the mobile application allowing retrieving data and analytics therefrom. A fleet manager 20 may communicate with the telematics server 300 using the administration terminal 400, the handheld administration terminal 410, or another form of administration terminals such as a tablet. In addition to retrieving data and analytics, the administration terminal 400 allows the fleet manager 20 to set alerts and geofences for keeping track of the assets 100, receiving notifications of deliveries, and so on.

The operator terminals 450 are electronic devices, such as smartphones or tablets. The operator terminals 450 are used by operators 10 (for example, vehicle drivers) of the assets 100 to track or configure the usage of assets 100. For example, as shown in FIG. 1, the operator 10_1 has the operator terminal 450_1, the operator 10_2 has the operator terminal 450_2, and the operator 10_N has the operator terminal 450_N. Assuming the operators 10 belong to a fleet of vehicles, each of the operators 10 may operate any of the assets 100. For example, FIG. 1 shows that the operator 10_1 is associated with the asset 100_1, the operator 10_2 is associated with the asset 100_2, and the operator 10_N is associated with the asset 100_N. However, any operator 10 may operate any asset 100 within a particular group of assets, such as a fleet. The operator terminals 450 are in communication with the telematics server 300 over the network 50. The operator terminals 450 may run at least one asset configuration application. The asset configuration application may be used by an operator 10 to inform the telematics server 300 that the asset 100 is currently being operated by the operator 10. For example, the operator 10_2 may use an asset configuration application on the operator terminal 450_2 to indicate that the operator 10_2 is currently using the asset 100_2. The telematics server 300 updates the telematics database 310 to indicate that the asset 100_2 is currently associated with the operator 10_2. Additionally, the asset configuration application may be used to report information related to the operation duration of the vehicle, the number of stops made by the operator during their working shift, and so on.

In operation, a telematics device 200 is coupled to an asset 100 to capture asset data. The asset data may be combined with location data obtained by the telematics device 200 from a location module in communication with the satellites 170 and/or sensor data gathered from sensors in the telematics device 200 or another device coupled to the telematics device 200. The combined asset data, location data, and sensor data may be termed "telematics data". The telematics device 200 sends the telematics data, to the telematics server 300 over the network 50. The telematics server 300 may process, aggregate, and analyze the telematics data to generate asset information pertaining to the assets 100 or to a fleet of assets. The telematics server 300 may store the telematics data and/or the generated asset information in the telematics database 310. The administration terminal 400 may connect to the telematics server 300, over the network 50, to access the generated asset information. Alternatively, the telematics server 300 may push the generated asset information to the administration terminal 400. Additionally, the operators 10, using their operator terminals 450, may indicate to the telematics server 300 which assets 100 they are associated with. The telematics server 300 updates the telematics database 310 accordingly to associate the operator 10 with the asset 100. Furthermore, the telematics server 300 may provide additional analytics related to the operators 10 including work time, location, and operating parameters. For example, for vehicle assets, the telematics data may include turning, speeding, and braking information. The telematics server 300 can correlate the telematics data to the vehicle's driver by querying the telematics database 310. A fleet manager 20 may use the administration terminal 400 to set alerts for certain activities pertaining to the assets 100. When criteria for an alert is met, the telematics server 300 sends a message to the administration terminal 400 to inform a fleet manager 20, and may optionally send alerts to the operator terminal 450 to notify an operator 10 of the alert. For example, an operator 10, who is operating the vehicle outside of a service area or hours of service may receive an alert on their operator terminal 450.

Telematics Device

Figure 2:
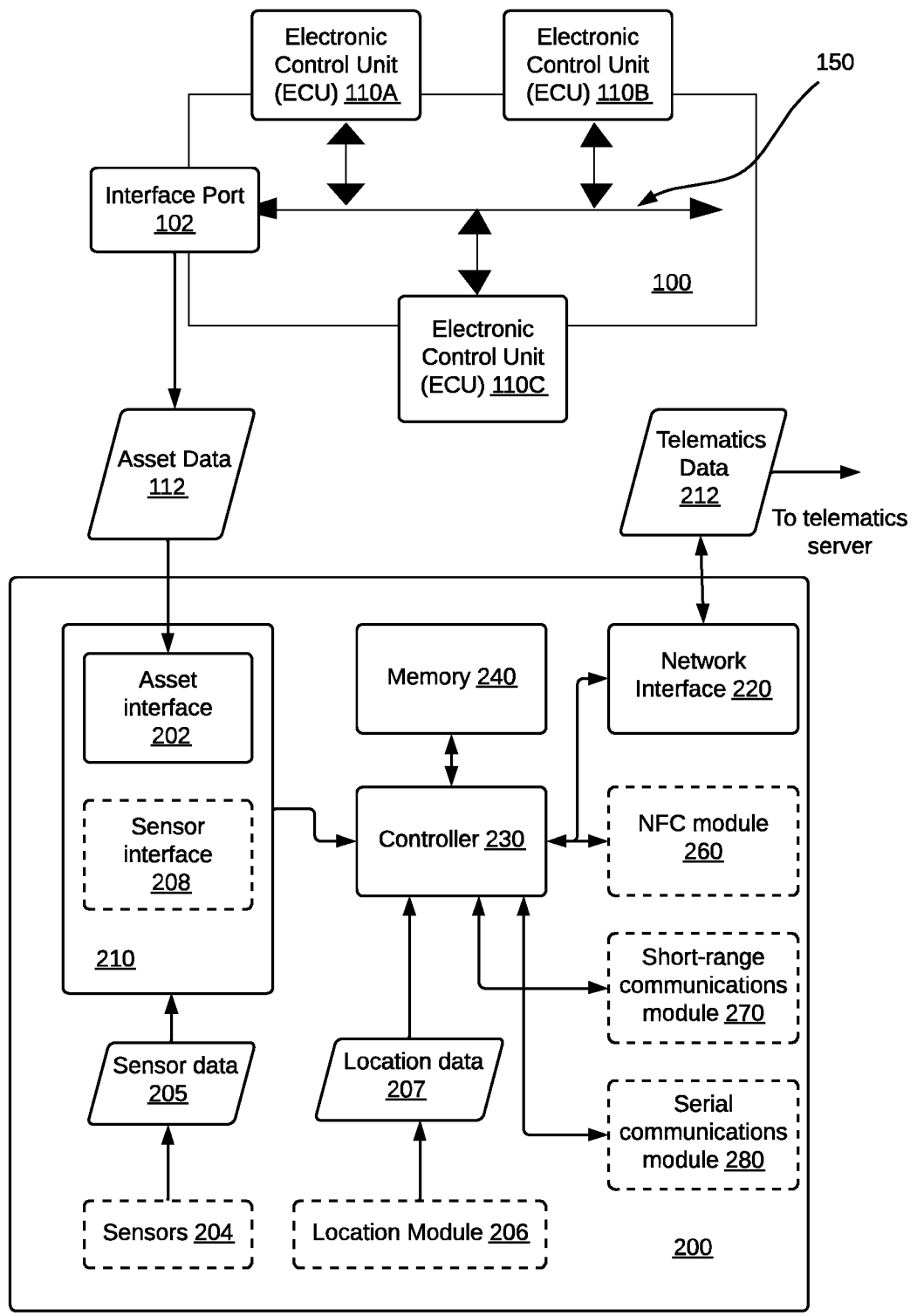
FIG. 2 is a block diagram showing a telematics device coupled to an asset.

Further details relating to the telematics device 200 and how it interfaces with an asset 100 are shown with reference to FIG. 2. FIG. 2 depicts an asset 100 and a telematics device 200 connected thereto. Selected relevant components of the asset 100 and the telematics device 200 are shown.

The asset 100 may have a plurality of electronic control units (ECUs). An ECU is an electronic module which interfaces with one or more sensors for gathering information from the asset 100. For example, an oil temperature ECU may contain a temperature sensor and a controller for converting the measured temperature into digital data representative of the oil temperature. Similarly, a battery voltage ECU may contain a voltage sensor for measuring the voltage at the positive battery terminal and a controller for converting the measured voltage into digital data representative of the battery voltage. A vehicle may, for example, have around seventy ECUs. For simplicity, a few of the ECUs 110 are depicted in FIG. 2. For example, in the depicted embodiment the asset 100 has three electronic control units: the ECU 110A, the ECU 110B, and the ECU 110C ("ECUs 110"). The ECU 110A, the ECU 110B, and the ECU 110C are shown to be interconnected via an asset communications bus. One example of the asset communications bus is a controller area network (CAN) bus. For example, the telematics device 200 is shown to have a CAN bus 150. ECUs 110 interconnected using a CAN bus may send and receive information to one another in CAN frames by placing the information on the CAN bus 150. When an ECU places information on the CAN bus 150, other ECUs 110 receive the information and may or may not consume or use that information. Different protocols may be used to exchange information between the ECUs over a CAN bus. For example, ECUs 110 in trucks and heavy vehicles use the Society of Automotive Engineering (SAE) J1939 protocol to exchange information over a CAN bus 150. Most passenger vehicles use the SAE J1979 protocol, which is commonly known as On-Board Diagnostic (OBD) protocol to exchange information between ECUs 110 on their CAN bus 150. In industrial automation, ECUs use a CANOpen protocol to exchange information over a CAN bus 150. An asset 100 may allow access to information exchanged over the CAN bus 150 via an interface port 102. For example, if the asset 100 is a passenger car, then the interface port 102 is most likely an OBD-II port. Data accessible through the interface port 102 is termed the asset data 112. In some embodiments, the interface port 102 includes a power interface for providing power to a telematics device 200 connected thereto.

The telematics device 200 includes a controller 230 coupled to a memory 240, an interface layer 210 and a network interface 220. The telematics device 200 also includes one or more sensors 204 and a location module 206 coupled to the interface layer 210. The telematics device 200 may also contain some optional components, shown in dashed lines in FIG. 2. For example, the telematics device 200 may contain one or more of: a near-field communications (NFC) module such as NFC module 260, a short-range wireless communications module 270, and a wired communications module such as a serial communications module 280. In some embodiments (not shown), the telematics device 200 may have a dedicated power source or a battery. In other embodiments, the telematics device 200 may receive power directly from the asset 100, via the interface port 102. The telematics device 200 shown is an example. Some of the components shown in solid lines may also be optional and may be implemented in separate modules. For example, some telematics devices (not shown) may not have a location module 206 and may rely on an external location module for obtaining the location data 207. Some telematics devices may not have any sensors 204 and may rely on external sensors for obtaining sensor data 205.

The controller 230 may include one or any combination of a processor, microprocessor, microcontroller (MCU), central processing unit (CPU), processing core, state machine, logic gate array, application-specific integrated circuit (ASIC), field-programmable gate array (FPGA), or similar, capable of executing, whether by software, hardware, firmware, or a combination of such, the actions performed by the controller 230 as described herein.

The memory 240 may include read-only-memory (ROM), random access memory (RAM), flash memory, magnetic storage, optical storage, and similar, or any combination thereof, for storing machine-executable programming instructions and data to support the functionality described herein. The memory 240 is coupled to the controller 230 thus enabling the controller 230 to execute the machine-executable programming instructions stored in the memory 240. The memory 240 may contain machine-executable programming instructions, which when executed by the controller 230, configures the telematics device 200 for receiving asset data 112 from the asset 100 via the asset interface 202, and for receiving sensor data 205 from the sensors 204 and/or location data 207 from the location module 206 via the sensor interface 208. The memory 240 may also contain machine-executable programming instructions for combining asset data 112, sensor data 205 and location data 207 into telematics data 212. Additionally, the memory 240 may further contain instructions which, when executed by the controller 230, configures the telematics device 200 to transmit the telematics data 212 via the network interface 220 to a telematics server 300 over a network 50.

The location module 206 may be a global positioning system (GPS) transceiver or another type of location determination peripheral that may use, for example, wireless network information for location determination. The sensors 204 may be one or more of: a temperature sensor, a pressure sensor, an optical sensor, an accelerometer, a gyroscope, or any other suitable sensor indicating a condition pertaining to the asset 100 to which the telematics device 200 is coupled.

The interface layer 210 includes an asset interface 202 and a sensor interface 208. The sensor interface 208 is configured for receiving the sensor data 205 and the location data 207 from the sensors 204 and the location module 206, respectively. For example, the sensor interface 208 interfaces with the location module 206 and with the sensors 204 and receives sensor data 205 and location data 207, respectively, therefrom. The interface layer 210 also includes an asset interface 202 to receive asset data 112 from the asset 100. In the depicted embodiment, the asset interface 202 is coupled to the interface port 102 of the asset 100. In other embodiments where the telematics device 200 is integrated into the asset 100, the asset interface 202 may receive the asset data 112 directly from the CAN bus 150. The asset data 112, received at the telematics device 200, from the asset 100 may be in the form of data messages, such as CAN frames. Asset data 112 may describe one or more of any of: a property, a state, and an operating condition of the asset 100. For example, where the asset 100 is a vehicle, the data may describe the speed at which the vehicle is travelling, a state of the vehicle (off, idle, or running), or an engine operating condition (e.g., engine oil temperature, engine RPM, or a battery voltage). In addition to receiving the asset data 112, in some embodiments the asset interface 202 may also receive power from the asset 100 via the interface port 102. The interface layer 210 is coupled to the controller 230 and provides the asset data 112, sensor data 205, and location data 207 to the controller 230.

The network interface 220 may include a cellular modem, such as an LTE-M modem, CAT-M modem, other cellular modem, Wi-Fi modem, or any other communication device configured for communication via the network 50 with which to communicate with the telematics server 300. The network interface 220 may be used to transmit telematics data 212 obtained from the asset 100 to the telematics server 300 for a telematics service or other purposes. The network interface 220 may also be used to receive instructions from the telematics server 300 as to how to communicate with the asset 100.

The NFC module 260 may be an NFC reader which can read information stored on an NFC tag. The NFC module 260 may be used to confirm the identity of the operator 10 by having the operator 10 tap an NFC tag onto the telematics device 200 such that the NFC tag is read by the NFC module 260. The information read from the NFC tag may be included in the telematics data 212 sent by the telematics device 200 to the telematics server 300.

The short-range wireless communications module 270 is a component intended for providing short-range wireless communication capability to the telematics device 200. The short-range wireless communications module 270 may be a Bluetooth™, wireless fidelity (Wi-Fi), Zigbee™, or any other short-range wireless communications module. The short-range wireless communications module 270 allows other devices to communicate with the telematics device 200 over a short-range wireless network.

The serial communications module 280 is an example of a wired communications module. The serial communications module 280 is an electronic peripheral for providing serial wired communications to the telematics device 200. For example, the serial communications module 280 may include a universal asynchronous receiver transmitter (UART) providing serial communications per the RS-232 protocol. Alternatively, the serial communications module 280 may be a serial peripheral interface (SPI) bus, or an inter-integrated circuit ($I^2C$) bus. As another example, the serial communications module 280 may include a universal serial bus (USB) transceiver.

In operation, an ECU 110, such as the ECU 110A, the ECU 110B, or the ECU 110C communicates asset data over the CAN bus 150. The asset data exchanged between the ECUs 110, over the CAN bus 150 are accessible via the interface port 102 and may be retrieved as the asset data 112 by the telematics device 200. The controller 230 of the telematics device 200 receives the asset data 112 via the asset interface 202. The controller 230 may also receive sensor data 205 from the sensors 204 and/or location data 207 from the location module 206 over the sensor interface 208. The controller 230 combines the asset data 112 with the sensor data 205 and the location data 207 to obtain the telematics data 212. The controller 230 transmits the telematics data 212 to the telematics server 300 over the network 50 via the network interface 220. Optionally, an operator 10 may tap an NFC tag to the NFC module 260 to identify themself as the operator 10 of the asset 100. Additionally, an external peripheral, such as a GPS receiver, may connect with the telematics device 200 via the short-range wireless communications module 270 for providing location information thereto.

The telematics data 212, which is comprised of asset data 112 gathered from the asset 100 combined with the sensor data 205 and the location data 207 may be used to derive useful data and analytics, by the telematics server 300. However, there are times when additional data, which is not provided by the asset 100, the sensors 204 or the location module 206 may be needed. The telematics device 200 may have a limited number of sensors 204 such as accelerometers or gyroscopes providing limited information about the motion of the asset 100 on which the telematics device 200 is deployed. The location module 206 may provide location and direction information. However, in some cases, more information may be needed to derive useful data and analytics pertaining to the asset 100. One example of information that is not typically provided by the telematics device 200 is video capture data. Another example of information that is not typically provided by the telematics device 200 is any proprietary signaling provided by devices which does not follow any of the standard protocols (OBD-II, J1939 or CANOpen). Some equipment may not have a CAN bus and may provide proprietary digital and/or analog signals. Examples of such devices include industrial equipment, winter maintenance equipment such as salt spreaders, farming equipment, and the like. Additionally, the telematics device 200 may not have an NFC module 260 or a short-range wireless communications module 270 thus limiting its connectivity capabilities.

Input/Output Expander

Figure 3:
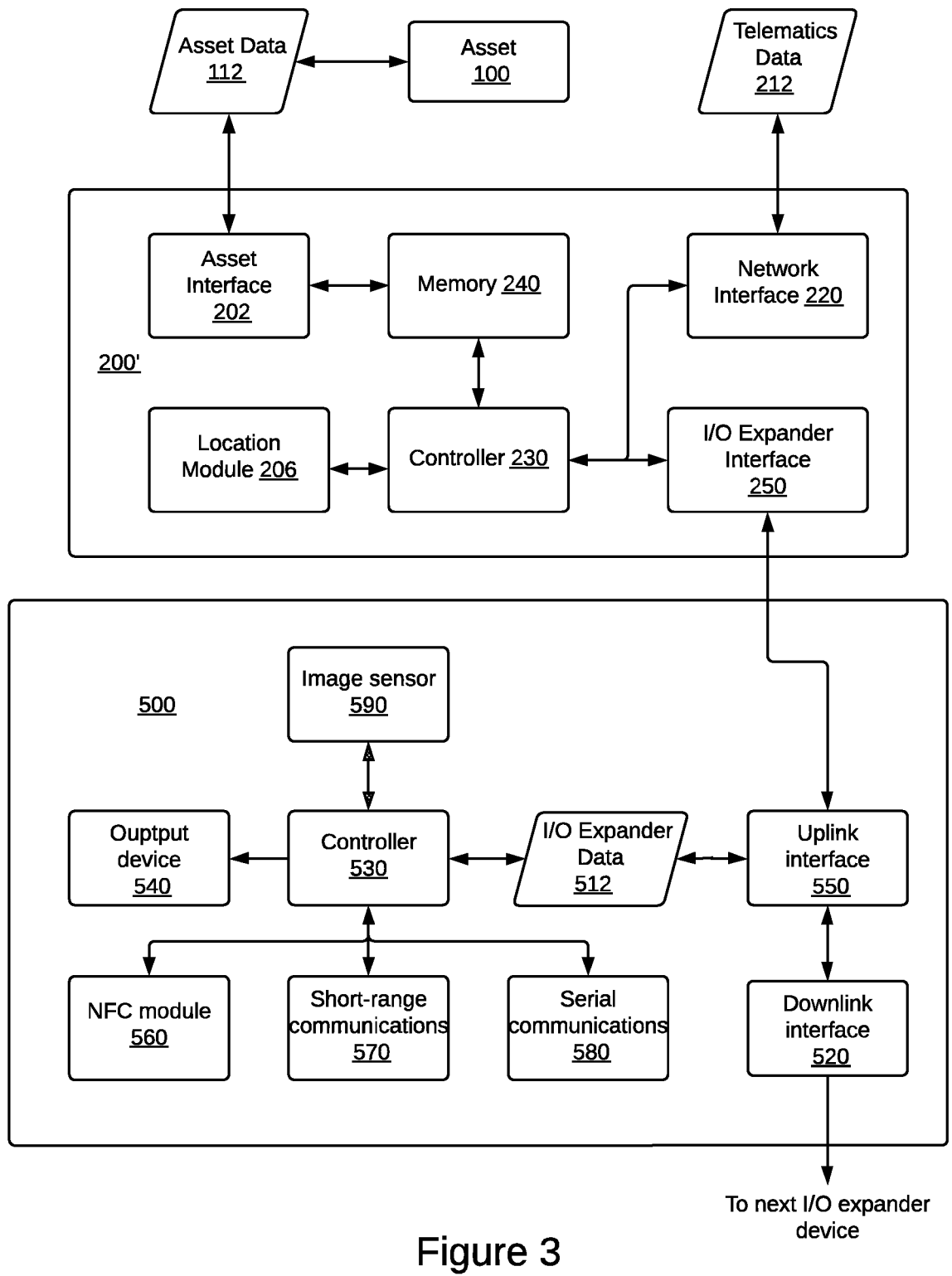
FIG. 3 is a block diagram showing a telematics device coupled to an asset and to an input/output (I/O) expander.

To capture and provide information or services not provided by the asset 100 or the telematics device, to produce an output, or to perform an action not supported by the telematics device, the telematics device 200 may be modified to allow an input/output expander device ("I/O expander") to connect thereto, as shown in FIG. 3. FIG. 3 shows a telematics device 200' coupled to an asset 100. An I/O expander 500 is coupled to the telematics device 200'.

The asset 100 is similar to the asset 100 of FIG. 2 and therefore the internal components thereof are not shown in FIG. 3 for simplicity.

The telematics device 200' has a somewhat similar configuration as the telematics device 200 of FIG. 2, but some of the optional components have been removed. Furthermore, the telematics device 200' adds an I/O expander interface 250 for interfacing with the I/O expander 500. The I/O expander interface 250 is coupled to the controller 230 and may be configured for exchanging I/O expander data 512 with the I/O expander 500.

The I/O expander 500 of FIG. 3 is an example I/O expander which is designed to provide additional connectivity options to a telematics device 200, which has more limited features than the one shown in FIG. 2. For example, the telematics device 200' shown in FIG. 3 does not have an NFC module, a short-range wireless communications module, or a serial communications module. Instead, the telematics device 200' has an I/O expander interface 250.

The I/O expander 500 may be an input device configured to capture additional data such as video frames, audio frames, or proprietary signals and provide that data to the telematics device 200'. Alternatively, or additionally, the I/O expander 500 may be configured as an output device and may include a display for displaying information and/or an audio output device for broadcasting messages pertaining to the asset 100.

An I/O expander 500, which connects with the telematics device 200', varies in complexity depending on the purpose thereof. FIG. 3 shows an I/O expander 500 containing several components which may or may not all be present in other I/O expanders. For example, the I/O expander 500 includes a controller 530, an NFC module 260, an output device 540, a short-range communications module 570, an image sensor 590, a serial communications module 580, an uplink interface 550 and a downlink interface 5.

The controller 530 may be similar to the controller 230. In some embodiments, the controller 530 is a microcontroller with versatile I/O capabilities. For example, the controller 530 may be a microcontroller which has a plurality of I/O ports such as general-purpose inputs and outputs (GPIOs), serial ports, analog inputs, and the like. In some embodiments, the controller 530 may have built-in persistent memory such as flash memory on which machine-executable programming instructions for carrying out the functionality of the I/O expander 500 may be stored. In other embodiments, the controller 530 may be coupled to a persistent memory module (not shown) that contains the machine-executable programming instructions for carrying out the functionality of the I/O expander 500. The controller 530 may also have built-in volatile memory, such as random-access memory (RAM) for storing data. Alternatively, the I/O expander 500 may be connected to an external volatile memory for storing data.

The output device 540 receives data from the controller 530 and performs an output function. For example, the output device 540 may include a display for displaying information received from the controller 530. As another example, the output device 540 may include a speech synthesizer and a speaker for displaying audible information received from the controller 530. As yet another example, the output device 540 may be an output interface to a hardware device. For example, the output device 540 may be a motor controller that interfaces to an electric motor.

The NFC module 560, short-range communications module 570, and the serial communications module 580 are similar to the NFC module 260, short-range wireless communications module 270, and the serial communications module 280 described above with reference to FIG. 2.

The image sensor 590 may be a digital still camera or a digital video camera capable of capturing images. For example, the image sensor 590 may be a road-facing dashboard camera for monitoring the road ahead. In other examples, the image sensor 590 may be a driver-facing dashboard camera for identifying the operator 10 and/or their condition.

The uplink interface 550 is an electronic peripheral interface coupled to the controller 530 and is used to provide data exchange and/or power capabilities to the I/O expander 500. The uplink interface 550 allows the I/O expander 500 to transmit and receive I/O expander data. The uplink interface 550 is configured to use the same protocol and signaling as the I/O expander interface 250 of the telematics device 200'. Accordingly, the I/O expander 500 may exchange the I/O expander data with the telematics device 200'. In some embodiments, the uplink interface 550 may also include power pins connected to corresponding power pins in the I/O expander interface 250, thus allowing the I/O expander 500 to be powered via the telematics device 200'. In other embodiments (not shown), the I/O expander 500 may have its own power source instead of or in addition to the power provided by the telematics device 200' via the uplink interface 550.

The downlink interface 520 is an electronic peripheral interface coupled to the uplink interface 550. The downlink interface 520 is configured to interface with the uplink interface 550 of another I/O expander 500 (as will be described below). Allowing the uplink interface 550 to connect to the downlink interface 520 of another I/O expander 500 allows the daisy chaining of I/O expanders 500.

Integrated Telematics Device

Figure 4:
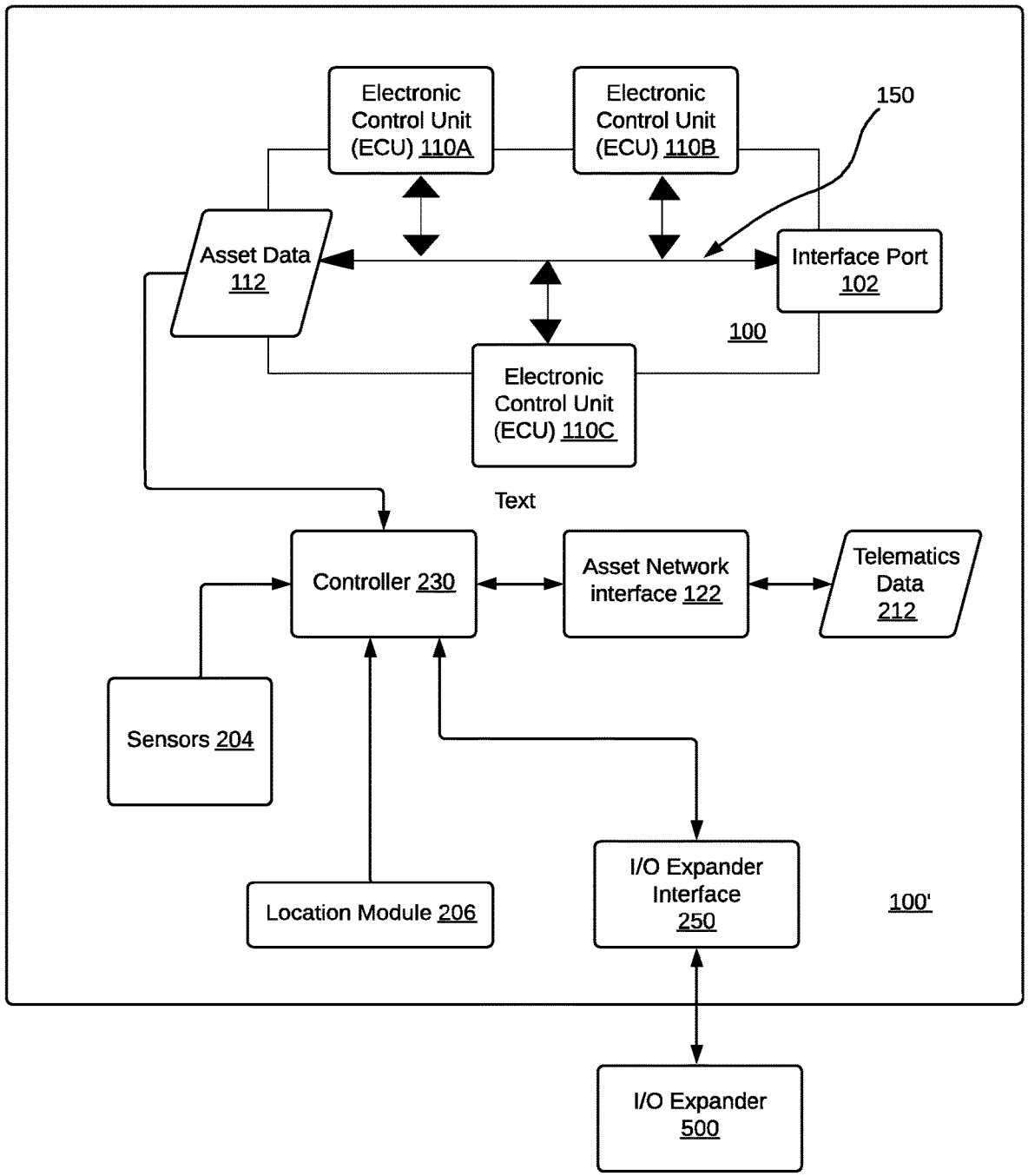
FIG. 4 is a block diagram showing an asset having a telematics device integrated therein and I/O expander coupled thereto.

In the above-mentioned figures, a telematics device is shown as a separate entity connected with a corresponding asset. The telematics device, however, may have its components integrated into the asset 100 at the time of manufacture of the asset 100. This may be the case when the asset 100 is a connected car having an asset network interface. For example, with reference to FIG. 4, there is shown an asset 100' with the components of a telematics device integrated therein, in accordance with embodiments of the present disclosure. The asset 100' is similar to the asset 100 but, being a connected asset such as a connected car, it has an asset network interface 122. In the depicted embodiment, the controller 230 is directly connected to the asset communications bus, which is a CAN bus 150 and may directly obtain the asset data 112 therefrom. The sensors 204 and the location module 206 are also integrated into the asset 100 and provide the sensor data 205 and the location data 207 to the controller 230 as described above. The asset network interface 122 belongs to the asset 100' and may be used by the asset 100 to communicate with an original equipment manufacturer (OEM) server, to a roadside assistance server, or for other purposes. The controller 230 may utilize the asset network interface 122 for the transmission of telematics data 212 provided by the controller 230. In order to support further not provided by the integrated peripherals such as the sensors 204 and the location module 206, the asset has an I/O expander interface 250 coupled to the controller 230 so that an I/O expander 500 may be connected to the asset 100' therethrough. The asset 100' may have an interface port 102 for connecting other devices other than a telematics device 200, such as a diagnostic tool including, but not limited to, an OBD-II reader device.

Reversal Detection

One of the most dangerous activities vehicle drivers do is backing up or reversing. It has been reported (by Secura Insurance, for example) that approximately one in four vehicle accidents occur when drivers are going in reverse. The US National Highway Transportation Safety Agency (NHTSA) reports an average of 210 fatalities and 15,000 injuries are caused by back-up accidents each year. The fatalities and injuries may also be accompanied by vehicle damage. Fleet owners and managers, therefore, wish to monitor and track reversing events in vehicles of their fleets. Many vehicles provide a reverse gear indication as part of the asset data 112. For example, a vehicle transmission ECU coupled to the vehicle's transmission may detect when the transmission is configured in the reverse gear ("R") and generate a reverse gear indication 114. The reverse gear indication 114 may be sent over the vehicle's communications bus, such as the CAN bus 150 and captured by a telematics device 200 over the interface port 102. Alternatively, if the telematics device 200 is integrated into the vehicle, the reverse gear indication 114 may be directly received by the controller 230 as part of the asset data 112. A reverse gear indication 114 by itself is not an indication that the vehicle is reversing. The vehicle speed indication is combined with the reverse gear indication to determine whether the vehicle is reversing, i.e., moving in the reverse direction. For example, vehicle reversing may be defined as a vehicle moving in the reverse direction by a current speed that is greater than about 0. In the context of this disclosure, about 0 is defined as a speed which is above 0 and above a very low threshold. For example, about 0 may be defined as a speed of 2 Km/h.

Figure 8:
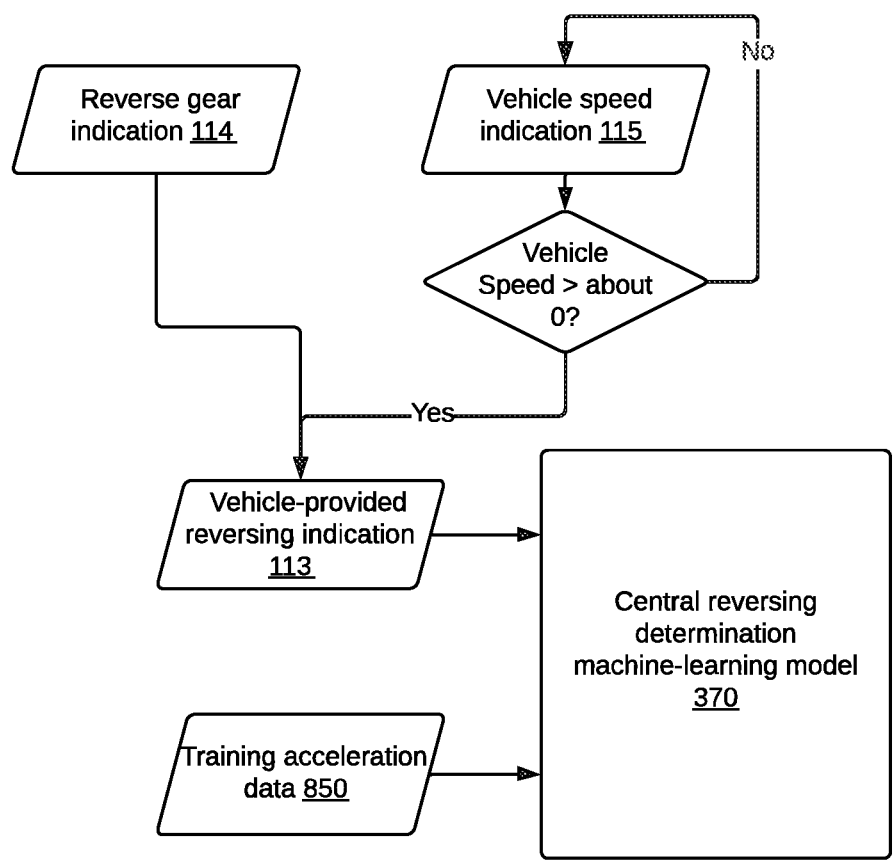
FIG. 8 is a block diagram depicting training the reversing determination ML model of FIG. 7 using a vehicle-provided reversing indication and corresponding training acceleration data, in accordance with embodiments of the present disclosure.

In some embodiments, a telematics device 200 may combine a vehicle speed 115 which is greater than about 0 (e.g., 3 Km/h or higher) with a reverse gear indication to conclude that the vehicle is reversing. The telematics device 200 may derive a vehicle-provided reversing indication 113 from the vehicle speed 115 and the reverse gear indication 114, as shown in FIG. 8. IN response to concluding that the vehicle is reversing, the telematics device 200 may sound an alarm or playback a message to the driver indicating that the vehicle is reversing. In other embodiments, the telematics device 200 may, additionally or alternatively, include the reverse gear indication 114 and vehicle speed 115 as part of the telematics data 212 sent to the telematics server 300. In this case, the telematics server 300 may determine that the vehicle is reversing, and record and analyze the reversing events made by a particular vehicle. A fleet manager 20, for example, may indicate to some vehicle drivers that their reversing is excessive or unnecessary and that they should find better ways to park and maneuver their vehicles. In some embodiments, the telematics server 300 may send a message to the operator terminal 450 for alerting the operator 10 regarding their reversing events either in real-time or at a later time.

While many vehicles report a reverse gear indication 114 as part of the asset data 112, many other vehicles do not. Accordingly, the telematics device 200 may need to rely on the sensors 204 to detect that the vehicle is moving in reverse direction. U.S. Pat. No. 8,744,700 ("'700") discloses a telematics device, deployed in a vehicle, the telematics device being capable of detecting when the vehicle is reversing. Specifically, the telematics device of the '700 patent detects an autonomously sensed change in a vehicle's operational state from an initial state to a subsequent state. At the initial state, the vehicle's speed equals about 0 (i.e., 2 Km/h or less, for example). At the subsequent state, the vehicle's speed is greater than about 0, and an accelerometer disposed in the telematics device indicates that the vehicle is moving in a longitudinal reverse direction.

Figure 5:
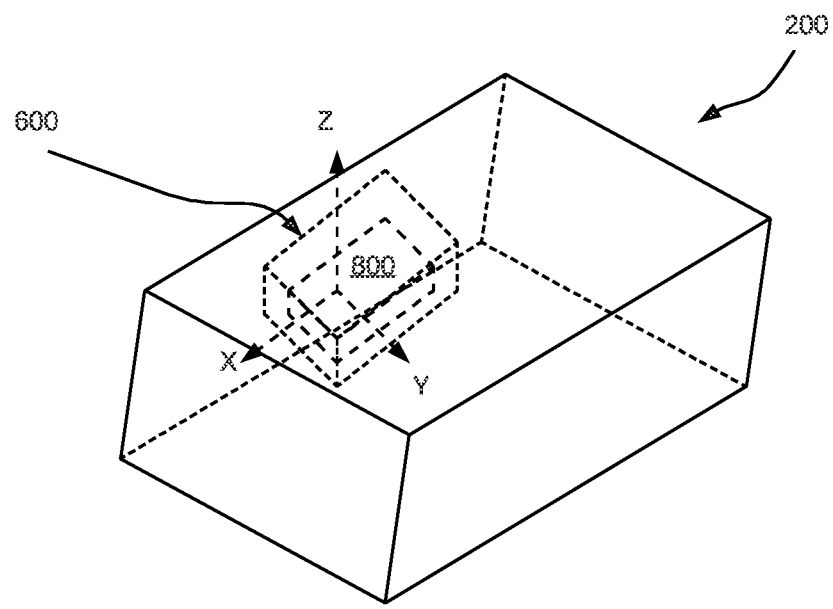
FIG. 5 depicts a telematics device including an inertial measurement unit (IMU) featuring a three-axis accelerometer.
Figure 6:
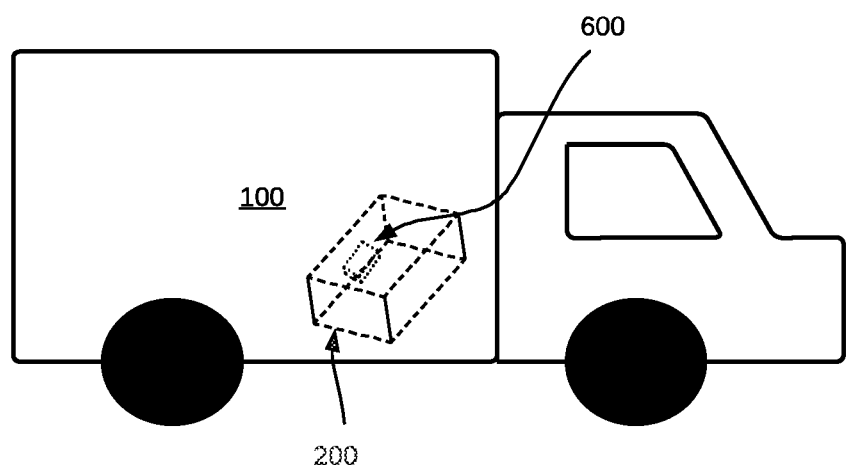
FIG. 6 depicts the telematics device of FIG. 5 deployed in a vehicle.
Figure 7:
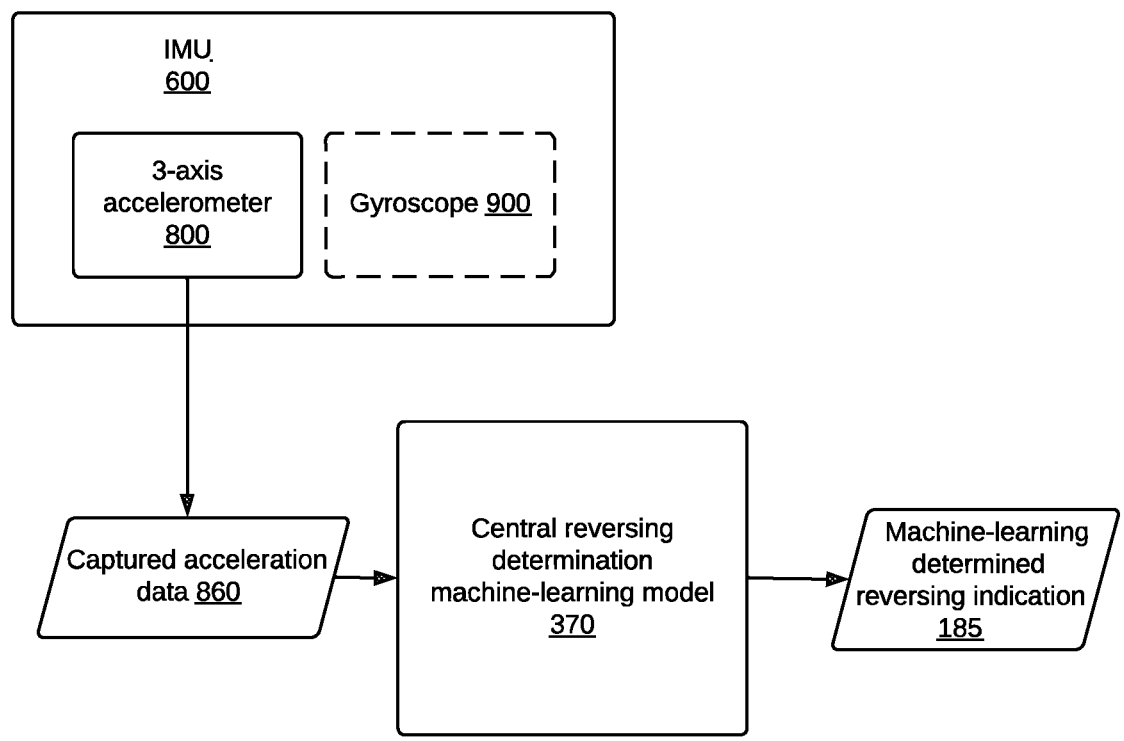
FIG. 7 is a block diagram showing a reversing determination machine-learning (ML) model generating a machine-learning-determined reversing indication based on captured acceleration data, in accordance with embodiments of the present disclosure.

The method by the telematics device in the '700 patent works in a telematics device having an accelerometer oriented along the longitudinal axis of the vehicle. Additionally, the forward and reverse directions need to be known so that the telematics device may determine that the vehicle is in reverse motion. This is not always the case. A telematics device 200 may be installed below the dashboard of a vehicle connected to an interface port 102 or may be attached at the end of a harness connected to the interface port 102. In either case, there is no guarantee that a particular accelerometer of the telematics device 200 will be oriented along the longitudinal axis of the vehicle. For example, with reference to FIGS. 5-7, a telematics device 200 may have an inertial measurement unit (IMU), such as the IMU 600 including a three-axis accelerometer 800 installed therein. In some embodiments, the IMU 600 may also include a gyroscope 900. The IMU 600 may be part of the sensors 204 or a separate component. The three-axis accelerometers 800, may be comprised of three accelerometers in the X-, Y-, and Z-direction, as shown in FIG. 5. While the X-axis accelerometer may be oriented along the longitudinal axis of the telematics device 200, this may not always be the case. Additionally, with reference to FIG. 6, a telematics device 200 may be deployed in a vehicle and may have any orientation, particularly if it is connected to the interface port 102 via a harness. It is, therefore, challenging to identify which accelerometer in the three-axis accelerometer 800 represents motion along the longitudinal axis of the vehicle. It is also challenging to determine the forward and reverse directions since it is not clear to the telematics device where the front and rear of the vehicle are. Furthermore, vehicles do not always back up in a straight line. In many instances when a vehicle is backing up from a parking position, the vehicle is reversing in a curved path. Accordingly, two accelerometers in the X-Y plane may report acceleration readings during a reversing event thus making it difficult to identify motion along the longitudinal axis and thus making it more difficult to ascertain that the vehicle is reversing.

In this disclosure, the inventors have proposed new methods and systems for detecting vehicle reversing events. The methods and systems utilize artificial intelligence and in particular machine learning techniques. For example, with reference to FIG. 7, there is shown a conceptual diagram for determining a machine-learning-determined reversing indication 185 using machine learning, in accordance with embodiments of the present disclosure. A central reversing determination machine-learning model 370 may be located at a server in a centralized location within a system. For example, the central reversing determination machine-learning model 370 may be located on the telematics server 300 within the telematics system 101. The central reversing determination machine-learning model 370 is provided with captured acceleration data 860 captured by a three-axis accelerometer 800 which is part of an IMU 600 deployed in an asset 100 either directly or as part of a telematics device 200 deployed in the asset 100. The manner in which the captured acceleration data 860 is captured is described below. The telematics device 200 sends the captured acceleration data 860 as part of the sensor data 205 included in the telematics data 212 sent to the telematics server 300. The central reversing determination machine-learning model 370 has a plurality of model parameters which need to be calibrated in order to accurately predict the machine-learning-determined reversing indication 185. Calibrating an ML model's parameters is done by training the model. The central reversing determination machine-learning model 370 may be trained as described below with reference to FIG. 8.

FIG. 8 depicts a conceptual diagram depicting the training of the central reversing determination machine-learning model 370. The central reversing determination machine-learning model 370 is trained using training data. Training data is comprised of labelled data, or input data for which the corresponding ML model output is known and that corresponding ML model output. In the depicted embodiment, the central reversing determination machine-learning model 370 is trained by training data comprising training acceleration data 850 and a vehicle-provided reversing indication 113 corresponding to the training acceleration data 850. The training data is gathered from vehicles providing a reverse gear indication 114 and a vehicle speed 115 as part of the asset data 112. A vehicle providing the training data includes a telematics device 200 having an IMU 600 including a three-axis accelerometer 800. When the vehicle's engine reports a reverse gear indication 114 and a vehicle speed indication indicating a vehicle speed which is greater than about 0 Km/h, it can be concluded that the vehicle is reversing. Accordingly, a vehicle-provided reversing indication 113 comprises a reverse gear indication 114 and a vehicle speed 115 indicating that the vehicle speed is greater than about 0 Km/h. The vehicle-provided reversing indication 113 represents a known output label, which may be provided to the central reversing determination machine-learning model 370 as part of the training data. The training acceleration data 850 represents accelerometer data corresponding to the vehicle moving in a reverse direction as indicated by the vehicle-provided reversing indication 113. Accordingly, the training data comprising the vehicle-provided reversing indication 113 and the training acceleration data 850 train the central reversing determination machine-learning model 370 by fine tuning the parameters thereof. As the central reversing determination machine-learning model 370 is better trained, the central reversing determination machine-learning model 370 is able to analyze captured acceleration data 860 from vehicles which do not include a reverse gear indication 114 and determine a machine-learning-determined reversing indication 185. The output prediction certainty of the machine-learning-determined reversing indication 185 is increased as the central reversing determination machine-learning model 370 is further trained with training data comprising the training acceleration data 850 and the vehicle-provided reversing indication 113 corresponding to the training acceleration data 850.

Figure 9:
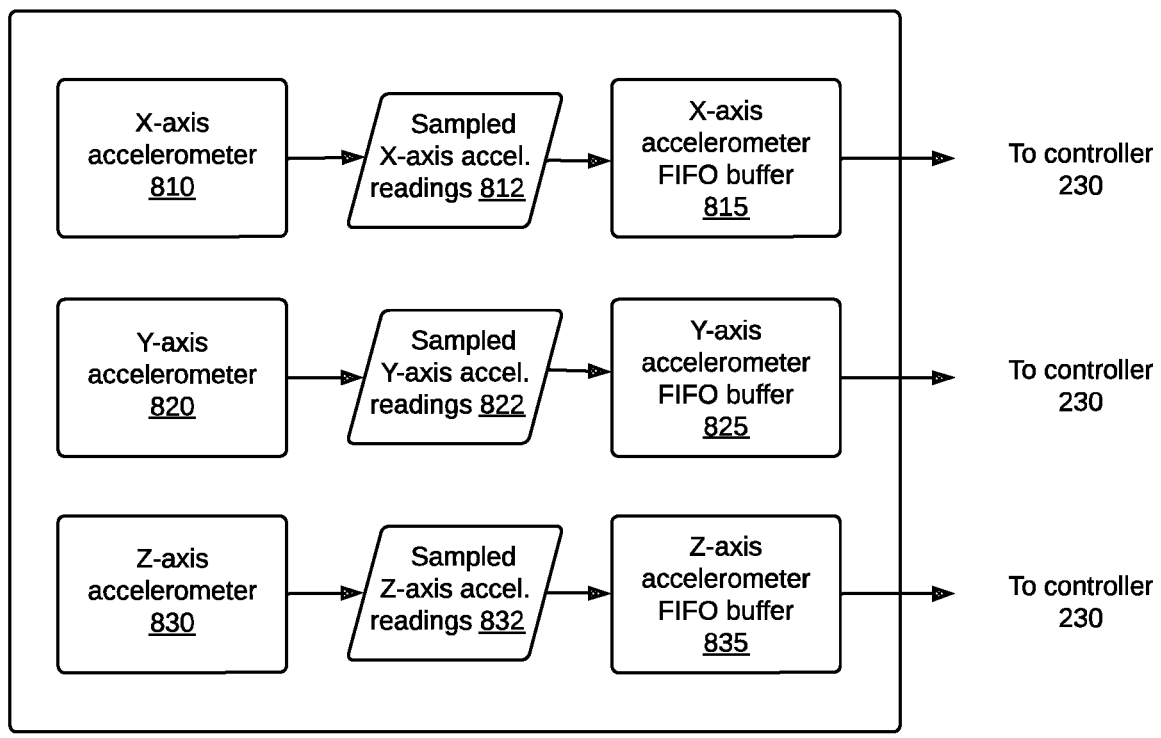
FIG. 9 is a representative block diagram of a three-axis accelerometer.

A three-axis accelerometer 800 deployed in a vehicle as part of an IMU 600 either installed directly in the vehicle or is part of a telematics device 200 coupled to the vehicle may be represented as shown in FIG. 9. The three-axis accelerometer 800 of FIG. 9 may be comprised of three accelerometers: an X-axis accelerometer 810, a Y-axis accelerometer 820, and a Z-axis accelerometer 830. Accelerometers detect and report acceleration in real-time at a particular sampling rate. For example, each of the X-axis accelerometer 810, the Y-axis accelerometer 820, and the Z-axis accelerometer 830 may have a sampling rate of 50 Hz or 100 Hz. Sampled accelerometer readings generated by each accelerometer may be buffered in a First-In-First-Out (FIFO) buffer. For example, as shown in FIG. 9, the X-axis accelerometer 810 generates sampled X-axis acceleration readings 812 which are buffered in the X-axis accelerometer FIFO buffer 815. Similarly, the Y-axis accelerometer 820 generates sampled Y-axis acceleration readings 822 which are buffered in the Y-axis accelerometer FIFO buffer 825 and the Z-axis accelerometer 830 generates sampled Z-axis acceleration readings 832 which are buffered in the Z-axis accelerometer FIFO buffer 835. The controller 230 of the telematics device 200 reads buffered acceleration readings from the X-axis accelerometer FIFO buffer 815, the Y-axis accelerometer FIFO buffer 825, and the Z-axis accelerometer FIFO buffer 835. The telematics device 200 may send the buffered acceleration readings from the three accelerometers to the telematics server 300.

Figure 10:
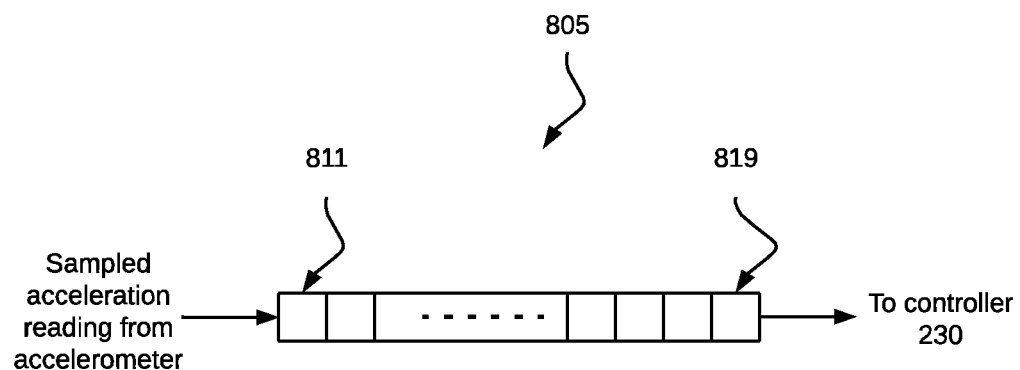
FIG. 10 is a representative diagram of an accelerometer First-In-First-Out (FIFO) buffer.

In order to better understand the nature of the captured acceleration data 860 and the training acceleration data 850, an overview of how the acceleration readings are buffered is helpful. FIG. 10 illustrates the operation of an accelerometer FIFO buffer 805 which is similar to the X-axis accelerometer FIFO buffer 815, the Y-axis accelerometer FIFO buffer 825, and the Z-axis accelerometer FIFO buffer 835 described above. With reference to the accelerometer FIFO buffer 805, a first sampled acceleration reading from an accelerometer is stored in the accelerometer FIFO buffer 805 at the first FIFO location 811 at a first sampling time. On the second sampling time, the contents of the accelerometer FIFO buffer 805 are shifted to the right and the second sampled acceleration reading from the accelerometer is stored at the first FIFO location 811. Assuming the FIFO buffer 805 has a size of N storage locations, then at the $N^{th}$ sampling time, the first sampled acceleration reading has shifted N times until it is at the last FIFO location 819 and the $N^{th}$ sampled acceleration reading is at the first FIFO location 811. After the accelerometer FIFO buffer 805 is full, further shifting of the contents of the accelerometer FIFO buffer 805 to the right will cause older sampled acceleration readings to be discarded. Accordingly, at any point, the controller 230 may read a finite number of sampled acceleration readings representing a period of time commensurate with the length of the accelerometer FIFO buffer 805. By way of example, assume that the accelerometer FIFO buffer 805 has 20 storage locations starting with the first FIFO location 811 and ending with the last FIFO location 819. Further assume that an accelerometer coupled with the accelerometer FIFO buffer 805 provides a sampled acceleration reading every 50 ms, or 20 sampled acceleration readings per second. In this example, the accelerometer FIFO buffer 805 stores 1000 ms or 1 second's worth of sampled acceleration readings.

Figure 11:
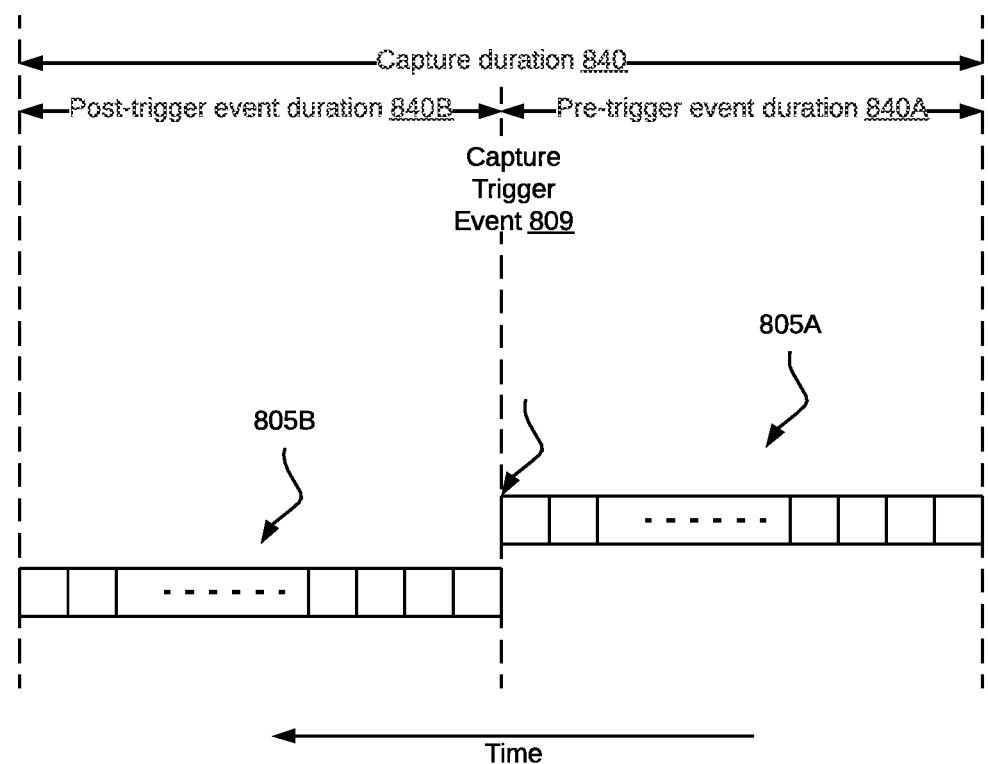
FIG. 11 is a diagram illustrating capturing acceleration data from the accelerometer FIFO buffer of FIG. 10 in response to a capture trigger event, in accordance with embodiments of the present disclosure.

For capturing training acceleration data 850, a correlation needs to be made between the vehicle-provided reversing indication 113 and the acceleration data. As such, the vehicle-provided reversing indication 113 is used as a capture trigger event for gathering the training acceleration data 850. FIG. 11 illustrates capturing acceleration readings before and after a capture trigger event 809. The accelerometer FIFO buffer 805A represents the accelerometer FIFO buffer 805 before the capture trigger event 809. The accelerometer FIFO buffer 805B represents the accelerometer FIFO buffer 805 after the capture trigger event 809. The telematics device 200 may capture acceleration readings for a capture duration 840 that includes a pre-trigger event duration 840A and a post-trigger event duration 840B. Upon detecting a capture trigger event 809, the controller 230 of the telematics device 200 may save the acceleration readings of the accelerometer FIFO buffer 805A. Additionally, the controller 230 may set a timer that expires after a post-trigger event duration 840B, which is the duration that it takes for the accelerometer FIFO buffer 805B to be filled with acceleration readings after the capture trigger event 809. To use the numerical example discussed above, the accelerometer FIFO buffer 805A contains 1 second worth of acceleration readings captured before the capture trigger event 809, which may be a vehicle-provided reversing indication 113. The controller 230 of the telematics device 200 may, in response to the capture trigger event 809, store a copy of the accelerometer FIFO buffer 805A, then set a post-trigger duration timer that expires after 1 second. Upon the expiry of the post-trigger event time, the controller 230 then copies the contents of the accelerometer FIFO buffer 805B which contains 1 second worth of acceleration readings captured after the capture trigger event 809. Accordingly, the captured training acceleration data contains acceleration readings covering a duration centered around the capture trigger event 809. For example, the telematics device 200 may capture 2 seconds worth of accelerometer data including a pre-trigger event duration of 1 second and a post-trigger event duration of 1 second.

The above-described capturing of training acceleration data 850 is done for the three accelerometers of a three-axis accelerometer 800. This is explained with reference to FIG. 12 and FIG. 13.

Figure 12:
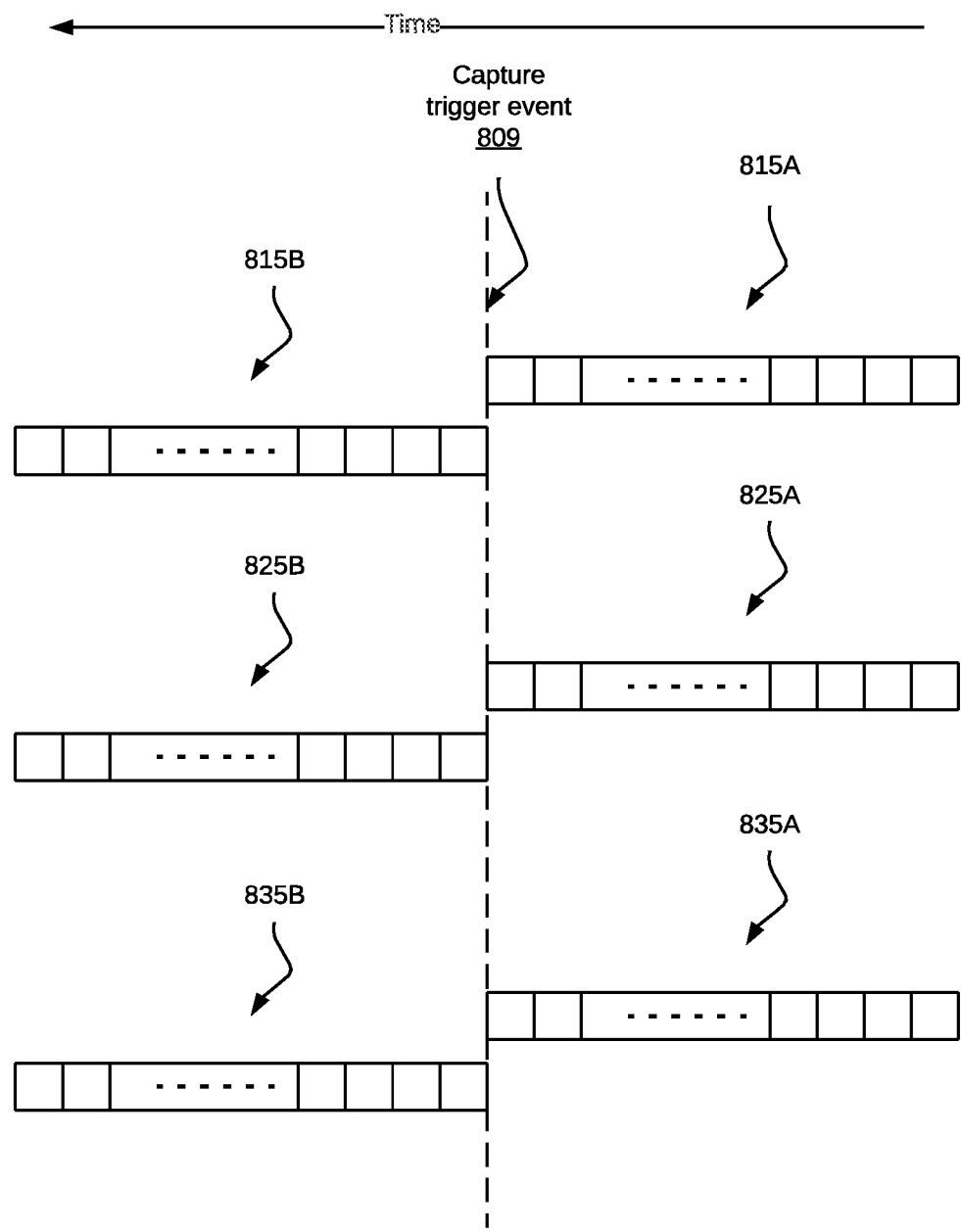
FIG. 12 is a diagram illustrating capturing training acceleration data from three accelerometer FIFO buffers in response to a capture trigger event, in accordance with embodiments of the present disclosure.
Figure 13:
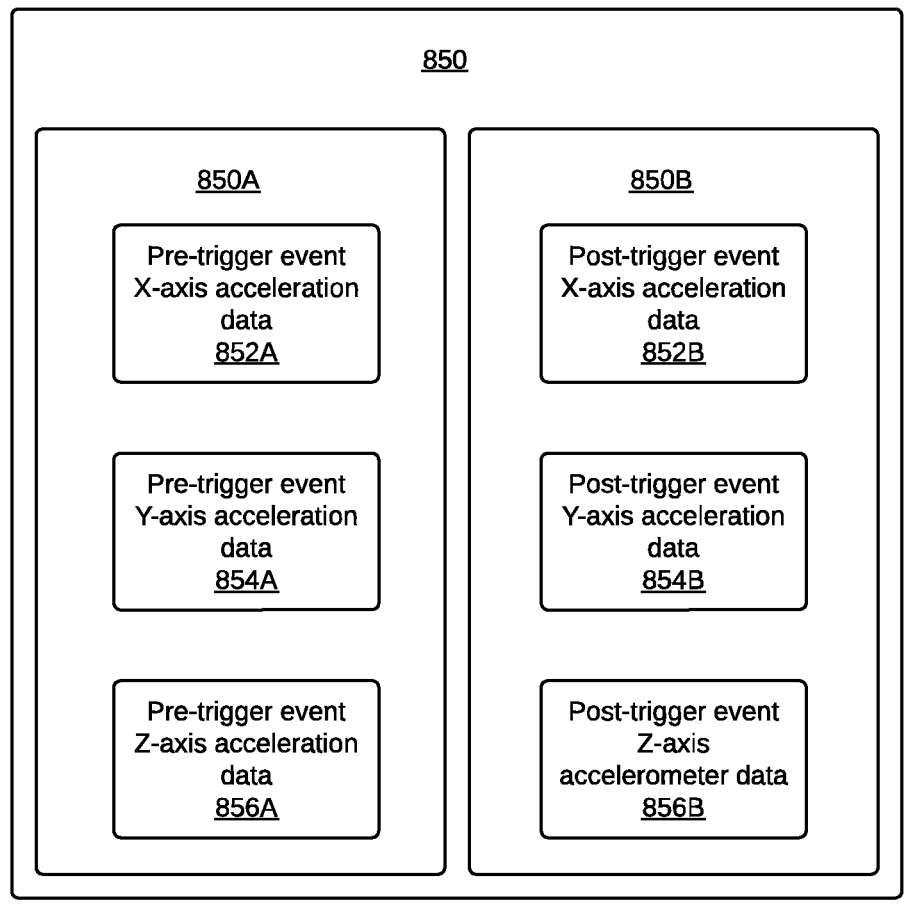
FIG. 13 is a block diagram showing the components of the training acceleration data used to train a reversing determination ML model, in accordance with embodiments of the present disclosure.

FIG. 12 depicts the X-axis accelerometer FIFO buffer 815, shown as the pre-trigger event X-axis accelerometer FIFO buffer 815A before the capture trigger event 809 and as the post-trigger event X-axis accelerometer FIFO buffer 815B after the capture trigger event 809. FIG. 12 also depicts the Y-axis accelerometer FIFO buffer 825, shown as the pre-trigger event Y-axis accelerometer FIFO buffer 825A before the capture trigger event 809 and as the post-trigger event Y-axis accelerometer FIFO buffer 825B after the capture trigger event 809. Furthermore, FIG. 12 depicts the Z-axis accelerometer FIFO buffer 835, shown as the pre-trigger event Z-axis accelerometer FIFO buffer 835A before the capture trigger event 809 and as the post-trigger event Z-axis accelerometer FIFO buffer 835B after the capture trigger event 809. FIG. 13 depicts a representation of the training acceleration data 850. The training acceleration data 850 is comprised of pre-trigger event acceleration data 850A and post-trigger event acceleration data 850B. The pre-trigger event acceleration data 850A is comprised of the pre-trigger event X-axis acceleration data 852A, the pre-trigger event Y-axis acceleration data 854A, and the pre-trigger event Z-axis acceleration data 856A. The post-trigger event acceleration data 850B is comprised of the post-trigger event X-axis acceleration data 852B, the post-trigger event Y-axis acceleration data 854B, and the post-trigger event Z-axis acceleration data 856B. Each of the pre- and post-trigger acceleration data is comprised of a plurality of sampled accelerometer readings buffered in their respective accelerometer FIFO buffers as described above.

In response to detecting a capture trigger event 809, the controller 230 of a telematics device 200 saves, stores, or copies each of: the pre-trigger event X-axis acceleration data 852A from the X-axis accelerometer FIFO buffer 815 (shown as 815A before the capture trigger event 809), the pre-trigger event Y-axis acceleration data 854A from the Y-axis accelerometer FIFO buffer 825 (shown as 825A before the capture trigger event 809), and the pre-trigger event Z-axis acceleration data 856A from the Z-axis accelerometer FIFO buffer 835 (shown as 835A before the capture trigger event 809). In response to detecting the capture trigger event 809, the controller 230 also configures a post-trigger duration timer that expires after a duration that ensures that sufficient post-trigger event acceleration data has been stored in the corresponding FIFO buffer, i.e. in the X-axis accelerometer FIFO buffer 815 (shown as 815B after the capture trigger event 809), in the Y-axis accelerometer FIFO buffer 825 (shown as 825B after the capture trigger event 809), and in the Z-axis accelerometer FIFO buffer 835 (shown as 835B after the capture trigger event 809). The post-trigger event acceleration data 850B is deemed sufficient if it can be used to train a central reversing determination machine-learning model 370. For example, a second of post-trigger event acceleration data 850B may be sufficient in combination with a second of pre-trigger event acceleration data 850A to train the central reversing determination machine-learning model 370. In response to the expiry of the post-trigger duration timer, the controller 230 of the telematics device copies the post-trigger event X-axis acceleration data 852B stored in the X-axis accelerometer FIFO buffer 815, the post-trigger event Y-axis acceleration data 854B stored in the Y-axis accelerometer FIFO buffer 825, and the post-trigger event Z-axis acceleration data 856B stored in the Z-axis accelerometer FIFO buffer 835 into the memory 240 and then sends copied data as part of the training acceleration data 850 (shown in FIG. 13) to the telematics server 300.

The capture trigger event 809 comprises a vehicle-provided reversing indication 113, which is comprised of a vehicle speed 115 that indicates that the vehicle speed is greater than about 0, and a reverse gear indication 114. If the vehicle-provided reversing indication 113 is determined in near-real-time, then the post-trigger event acceleration data 850B may be sufficient to train the central reversing determination machine-learning model 370. For example, if the vehicle provides CAN frames containing the vehicle speed 115 at a frequent rate and provides a reverse gear indication 114 within a brief duration of the reverse gear being engaged, then the trigger event 809 is early enough in the reversing action that little to no pre-trigger event acceleration data 850A may be needed to train the central reversing determination machine-learning model 370. In such cases, the training acceleration data 850 is comprised of post-trigger event acceleration data 850B. In the example provided earlier, a FIFO holds about 1 second worth of acceleration data. If the reverse gear is engaged and the reverse gear indication arrives at the telematics device 200 within say 100 ms, then 90% of the FIFO buffer contains buffered acceleration data that is not related to the reversing action. In this case, it is safe to ignore the pre-trigger event acceleration data in the FIFO.

If the vehicle-provided reversing indication 113 is determined after a delay, then the pre-trigger event acceleration data 850A contains valuable acceleration data and needs to be part of the training acceleration data 850. For example, if a reverse gear indication 114 or the vehicle speed 115 are delayed until sometime after the vehicle has started moving in reverse direction, then the training acceleration data 850 is best comprised of both the pre-trigger event acceleration data 850A and the post-trigger event acceleration data 850B. In the example provided earlier, a FIFO holds about 1 second worth of acceleration data. If the reverse gear is engaged and the reverse gear indication arrives at the telematics device more than 1 second later, then at the time the reverse gear indication arrives (i.e., when the trigger event is detected), the pre-trigger event acceleration data 850A contains acceleration data that is highly correlated with the reversing action. Accordingly, the training acceleration data 850 is best comprised of both the pre-trigger event acceleration data 850A and the post-trigger event acceleration data 850B.

Figure 14:
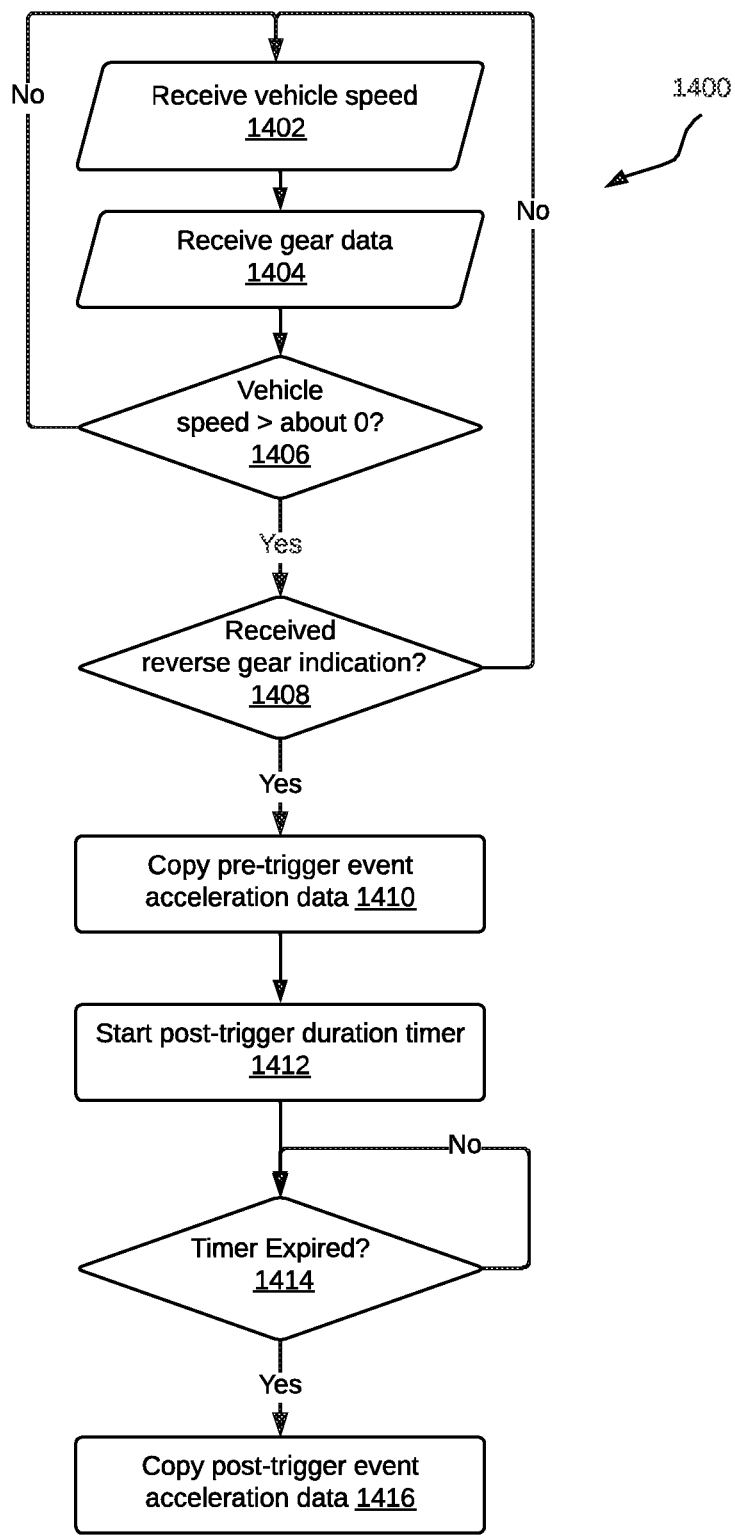
FIG. 14 is a flow chart for a method of capturing training acceleration data from a vehicle, in accordance with embodiments of the present disclosure.

FIG. 14 depicts a method 1400 of gathering the training acceleration data 850 by a telematics device 200 deployed in a vehicle asset that provides a gear reverse indication as part of the asset data 112. The method begins at step 1402 at which the telematics device 200 receives a vehicle speed 115 from the vehicle. The vehicle speed 115 may be periodically requested by the telematics device or provided in a broadcast CAN frame that is regularly sent by an ECU 110, such as a transmission ECU, on the CAN bus. At step 1404, the telematics device 200 receives gear data from the vehicle. In some embodiments, the gear data is sent whenever the current gear in the vehicle's transmission is switched to another gear. At step 1406, the telematics device 200 determines whether the vehicle speed is greater than about 0 Km/h. For example, the condition at step 1406 may become true if the vehicle speed is 3 Km/h or higher. If the vehicle speed is less than about 0, then control goes back to step 1402. If the vehicle speed 115 is greater than about 0, then control proceeds to step 1408.

At step 1408, the gear data is checked to determine the presence of a reverse gear indication 114 in the received gear data. If no reverse gear indication 114 is detected or received, then control goes back to step 1402. If a reverse gear indication 114 is received, then it is determined that the vehicle is reversing based on the vehicle speed 115 being greater than about 0 and on the reverse gear indication 114. The combination of the vehicle speed 115 being greater than 0 and the reverse gear indication 114 comprises a vehicle-provided reversing indication 113, which is a known output label. Additionally, the combination of the vehicle speed being greater than 0 and the reverse gear indication 114 represents a capture trigger event 809 for capturing the training acceleration data 850.

At step 1410, the telematics device 200 copies the pre-trigger event acceleration data 850A from the respective accelerometer FIFO buffers. As discussed above, in some embodiments the pre-trigger event acceleration data 850A may not be included in the training acceleration data 850. As such the step 1410 may be optional as discussed above.

At step 1412, the telematics device 200 starts a post-trigger duration timer.

At step 1414, the telematics device 200 checks whether the post-trigger duration timer has expired. If the post-trigger duration timer has not expired, then control stays in step 1414. When the post-trigger duration timer expires, control goes to step 1416.

At step 1416, the post-trigger event acceleration data 850B is copied from the respective accelerometer FIFO buffers. The training acceleration data 850 and the vehicle-provided reversing indication 113 corresponding to the training acceleration data 850, gathered by the method 1400 are sent, by the telematics device 200, to the telematics server 300 where they are used to train the central reversing determination machine-learning model 370 which is implemented on the telematics server 300.

Figure 15:
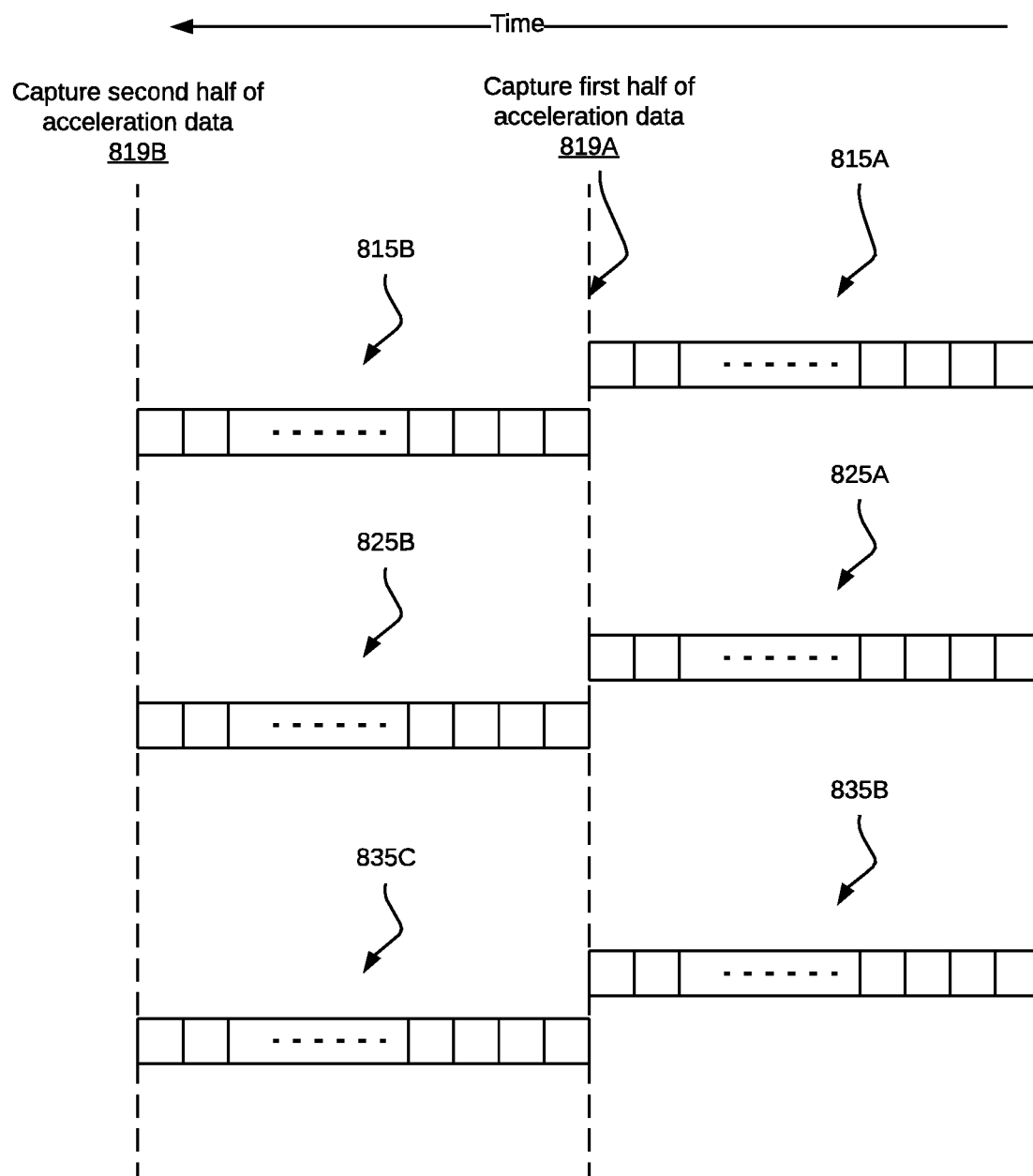
FIG. 15 is a diagram illustrating capturing acceleration data from three accelerometer FIFO buffers for providing same to a reversing determination ML model, in accordance with embodiments of the present disclosure.

Gathering the captured acceleration data 860 from vehicles that do not provide a reverse gear indication 114 may be done as described with reference to FIG. 15. The accelerometer FIFO buffers shown represent the contents of the X-axis accelerometer FIFO buffer 815, the contents of the Y-axis accelerometer FIFO buffer 825, and the contents of the Z-axis accelerometer FIFO buffer 835 as they are sampled periodically. The accelerometer FIFO buffers are sampled in response to a first synchronous trigger event 819A and a second synchronous trigger event 819B. The first synchronous trigger event 819A causes the contents of the three accelerometer FIFO buffers, which were captured from the accelerometers prior to the first synchronous trigger event 819A, to be copied by the telematics device 200 and stored. The second synchronous trigger event 819B causes the contents of the three accelerometer FIFO buffers, which were captured from the accelerometers after the first synchronous trigger event 819A but before the second synchronous trigger event 819B, to be copied by the telematics device 200 and stored. The acceleration data captured in response to the first synchronous trigger event 819A and the acceleration data captured in response to the second synchronous trigger event 819B are combined to form the captured acceleration data 860. The captured acceleration data 860 is similar in structure to the training acceleration data 850 shown in FIG. 13. Similar to the numerical example given above with respect to the training acceleration data 850, the captured acceleration data 860 may comprise 2 seconds of sampled acceleration data.

The first synchronous trigger event 819A and the second synchronous trigger event 819B may be timer expiration events such as timer interrupts. In the depicted embodiment, the captured acceleration data 860 represents acceleration data captured from the three accelerometers at two successive timer periods. In some embodiments, acceleration data captured in a single timer period may comprise the captured acceleration data 860 and may be sufficient for the central reversing determination machine-learning model 370 to determine a machine-learning-determined reversing indication 185. In this case, captured acceleration data 860 is sent to the telematics server 300 every timer period at synchronous trigger events generated by the timer expiry.

In some embodiments, the first synchronous trigger event 819A and the second synchronous trigger event 819B are not generated unless the vehicle reports a speed that is greater than about 0. In other words, if the vehicle is substantially stationary then there is little value in sending captured acceleration data as the vehicle is likely not reversing. The capturing of acceleration data in response to synchronous trigger events is only activated in response to detecting a vehicle speed greater than about 0.

Figure 16:
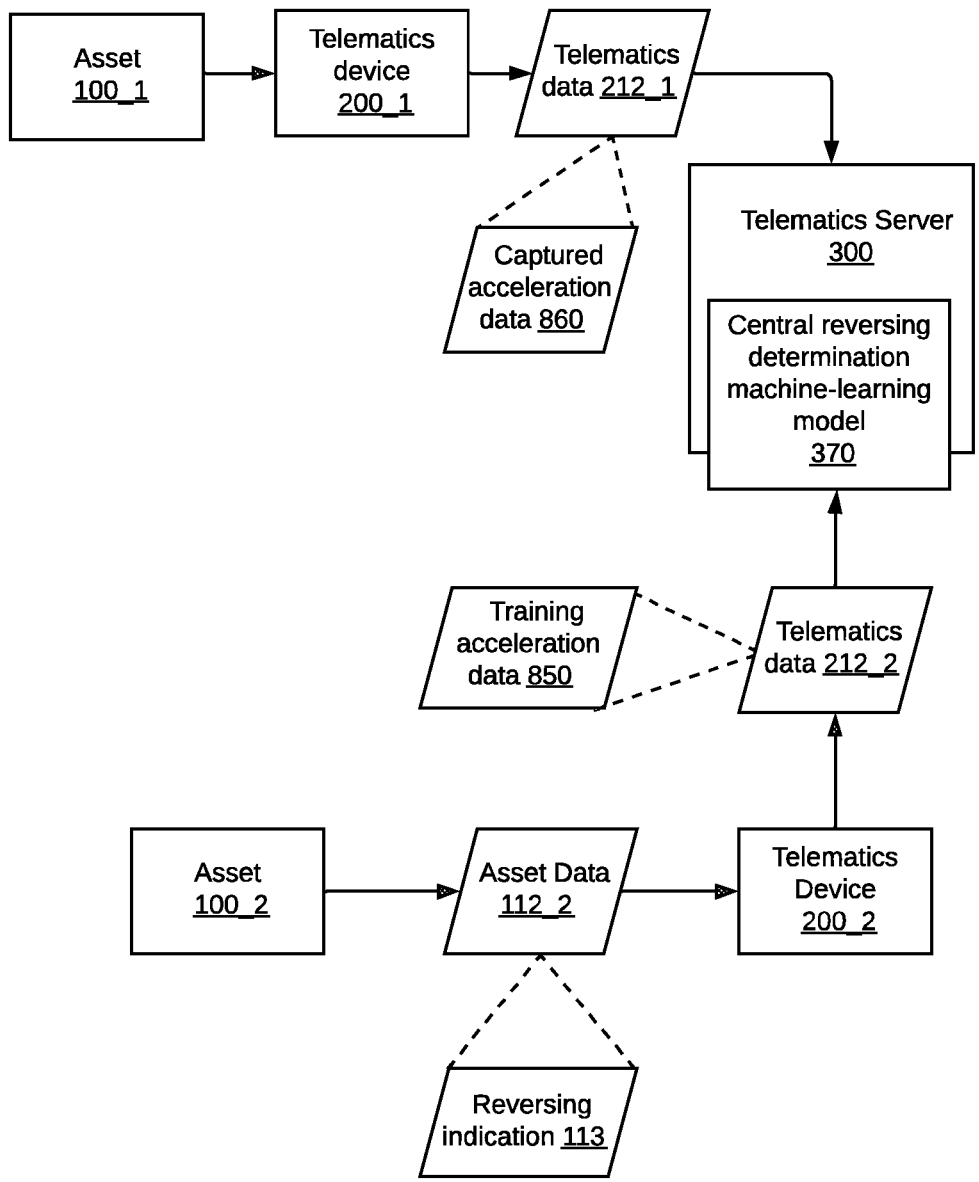
FIG. 16 is an architecture diagram of a simplified system utilizing training acceleration data provided by a first telematics device coupled to a first vehicle to train a reversing determination ML model, which in turn is used for reversing determination of a second vehicle, in accordance with embodiments of the present disclosure.

A simplified system architecture shown in FIG. 16 illustrates how a first vehicle may send training acceleration data 850 to train the central reversing determination machine-learning model 370, while a second vehicle may send captured acceleration data 860 which the central reversing determination machine-learning model 370 can use to generate a machine-learning-determined reversing indication 185.

The system shown in FIG. 16 includes an asset 100_1 to which a telematics device 200_1 is coupled. The asset data provided by the asset 100_1 does not include gear data, so it is not shown as it is not relevant to the method being discussed. The telematics device 200_1 sends telematics data 212_1 which includes captured acceleration data 860 to the telematics server 300. The telematics server 300 runs a central reversing determination machine-learning model 370 and, in response to receiving the captured acceleration data 860, the telematics server 300 uses the central reversing determination machine-learning model 370 to generate a machine-learning-determined reversing indication 185.

The system shown in FIG. 16 also includes an asset 100_2 to which a telematics device 200_2 is coupled. The asset data 112_2 provided by the asset 100_2 contains a vehicle-provided reversing indication 113. The vehicle-provided reversing indication 113 is comprised of an indication that the vehicle's reverse gear is engaged and an indication that the vehicle speed is greater than about 0. The telematics device 200_2 contains a three-axis accelerometer 800 and gathers training acceleration data 850 therefrom as discussed above. The asset data 112_2, including the vehicle-provided reversing indication 113, and the training acceleration data 850 are included in the telematics data 212_2 sent to the telematics server 300. The telematics server 300 uses the training acceleration data 850 and the vehicle-provided reversing indication 113 to train the central reversing determination machine-learning model 370 to generate a machine-learning-determined reversing indication 185.

In some embodiments, a method carried out by the system of FIG. 16 includes the step of the telematics server 300 logging the machine-learning-determined reversing indication 185 for the first vehicle in the telematics database 310.

In some embodiments, the telematics server 300 sends the machine-learning-determined reversing indication 185 to the telematics device 200. The telematics device 200 may generate an alert to the driver indicating that the vehicle is reversing.

The system shown in FIG. 16 utilizes a central reversing determination machine-learning model 370 which is residing on the telematics server 300. As discussed above, the telematics device 200_1 sends captured acceleration data 860 to the telematics server 300 and the central reversing determination machine-learning model 370 provides a machine-learning-determined reversing indication 185 which indicates whether the asset 100_1 is reversing. In some embodiments, the telematics server 300 may send the machine-learning-determined reversing indication 185 back to the telematics device 200_1 so that the telematics device 200_1 may provide some feedback to the operator 10_1 of the asset 100_1. For example, the telematics device 200_1 may beep or flash an indicator so that the operator 10_1 is alerted to the vehicle reversing condition.

While the system shown in FIG. 16 may provide feedback to the operator 10_1 as just described, the communication with the telematics server 300 may introduce some latency such that the feedback provided to the operator 10_1 is not in real-time. Furthermore, other actions that may need to be taken in response to the machine-learning-determined reversing indication 185 may also not be carried out in real-time due to the latency in the communication between the telematics server 300 and the telematics device 200. Accordingly, in another embodiment of the present disclosure, there is provided a system for reversing detection that includes an edge reversing determination machine-learning model 290, as discussed below with reference to FIG. 17.

Figure 17:
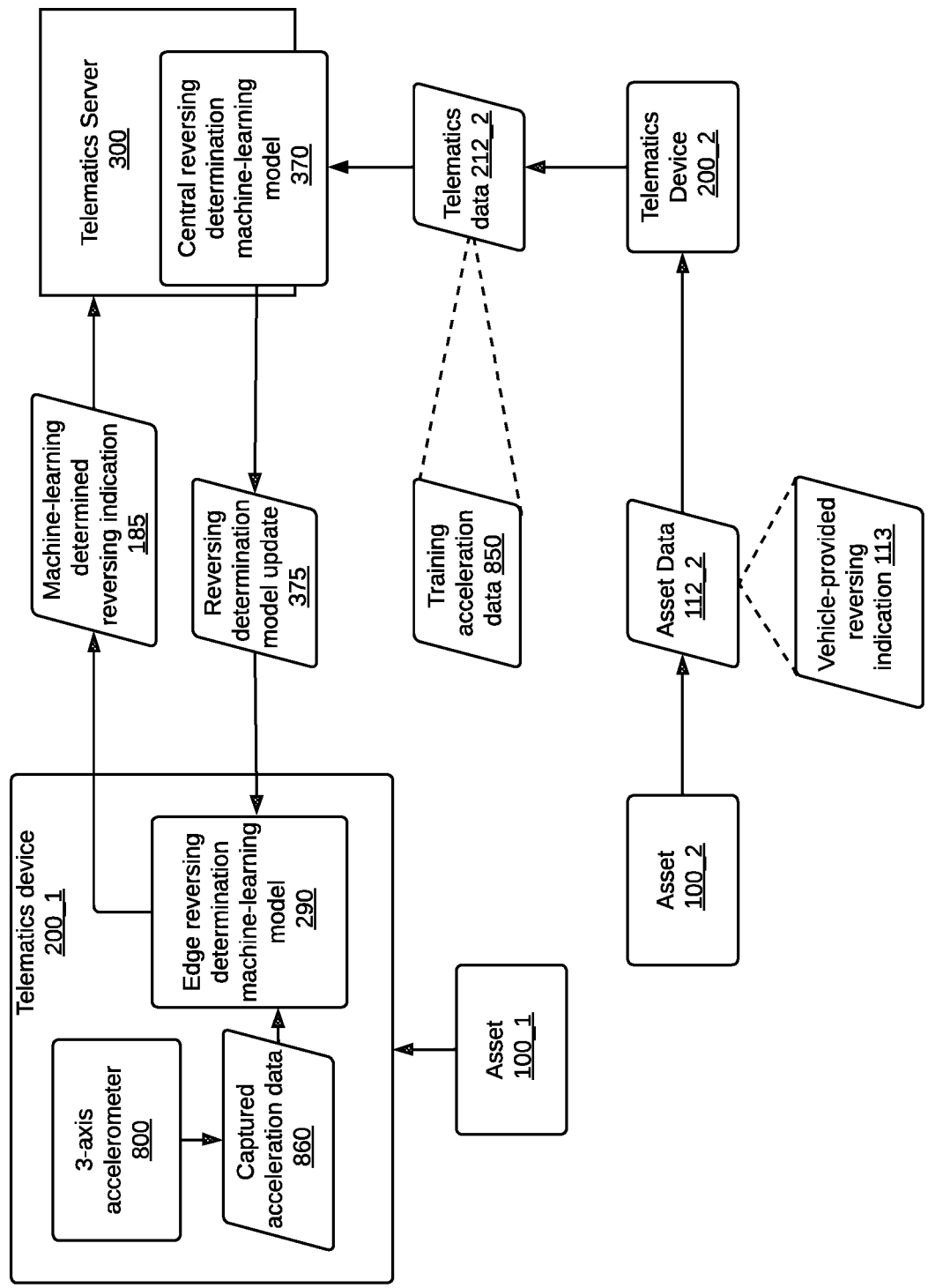
FIG. 17 is an architecture diagram of a simplified system utilizing a reversing determination model update provided by a telematics server to train an edge reversing determination machine-learning model to generate a machine-learning-determined reversing indication, in accordance with embodiments of the present disclosure.

With reference to FIG. 17, there is shown a system for providing a machine-learning-determined reversing indication that utilizes an edge reversing determination machine-learning model 290 on the telematics device 200_1. The system depicted in FIG. 17 is somewhat similar to the system of FIG. 16. Accordingly, emphasis will be to describe the differences therebetween. Additionally, some components were omitted due to space limitations and to emphasize other components, of the telematics device 200_1, for example.

The telematics server 300 has a central reversing determination machine-learning model 370 that is trained by the training acceleration data 850, included in the telematics data 212_2 provided by the telematics device 200_2.

The telematics device 200_1 has an edge reversing determination machine-learning model 290. The term "edge" indicates that the edge reversing determination machine-learning model 290 is residing on the telematics device 200_1 as opposed to being in a central location on the telematics server 300. The edge reversing determination machine-learning model 290 receives captured acceleration data 860 and provides a machine-learning-determined reversing indication 185. The machine-learning-determined reversing indication 185 is determined at the telematics device 200_1 and may be used to generate an alert for the operator 10_1 of the asset 100_1. Additionally, the machine-learning-determined reversing indication 185 may be sent to the telematics server 300 so that the telematics server 300 may log the reversing event and/or alert a fleet manager 20 using an administration terminal 400.

The edge reversing determination machine-learning model 290 is not trained by training acceleration data. Instead, a reversing determination model update 375 is sent by the telematics server 300 to the telematics device 200_1. Specifically, upon training the central reversing determination machine-learning model 370, which resides on the telematics server 300, a reversing determination model update 375 containing updated values of the model parameters is sent to the telematics device 200_1 to update the model parameters of the edge reversing determination machine-learning model 290. In some embodiments, the reversing determination model update 375 is sent periodically by the telematics server 300 and received by the telematics device 200_1. In other embodiments, the telematics server 300 examines the accuracy of the output prediction of the central reversing determination machine-learning model 370. When the accuracy of the output prediction of the central reversing determination machine-learning model 370 is improved, the telematics server 300 sends a reversing determination model update 375 to the telematics device 200_1 to update the edge reversing determination machine-learning model 270.

Figure 18:
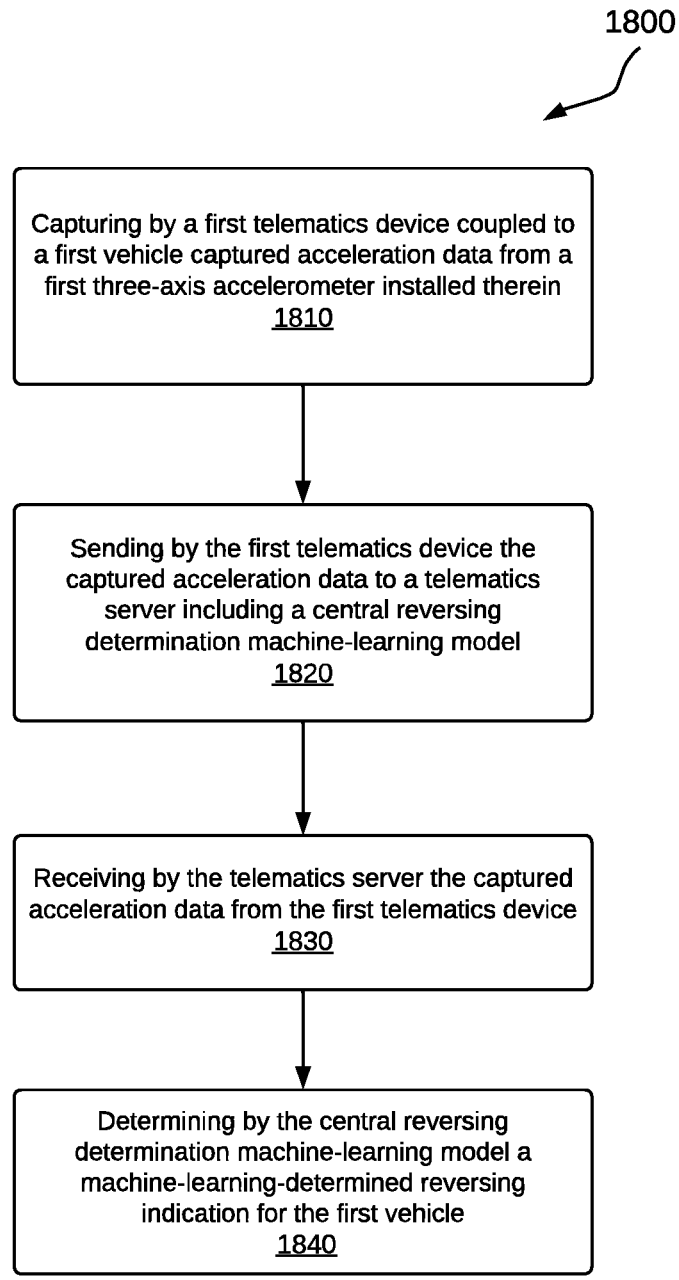
FIG. 18 is a flow chart of a method for providing a machine-learning-determined reversing indication, in accordance with embodiments of the present disclosure.

FIG. 18 depicts a method 1800 for determining a machine-learning-determined reversing indication, in accordance with embodiments of the present disclosure. The method 1800 may be performed by the system of FIG. 16.

At step 1810, a telematics device 200_1 coupled to a vehicle, such as the asset 100_1 captures captured acceleration data 860 from a three-axis accelerometer 800 installed in the telematics device 200_1.

At step 1820, the telematics device 200_1 sends the captured acceleration data 860 to a telematics server 300. The telematics server 300 includes a central reversing determination machine-learning model 370.

At step 1830, the telematics server 300 receives the captured acceleration data 860 from the telematics device 200_1.

At step 1840, the central reversing determination machine-learning model 370 determines a machine-learning-determined reversing indication 185 for the first vehicle.

Figure 19:
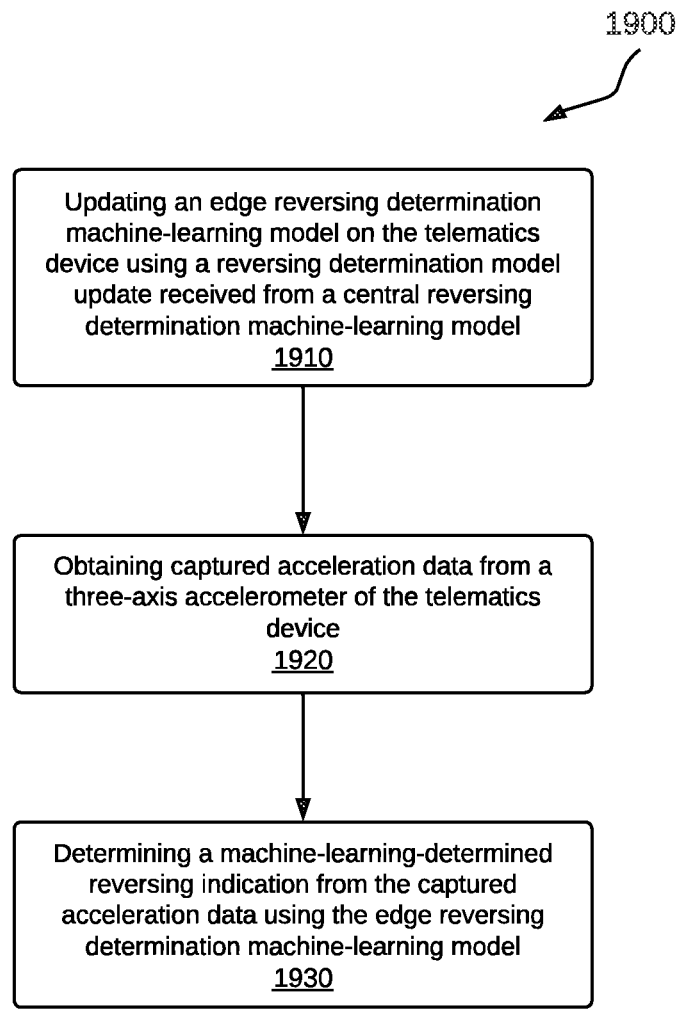
FIG. 19 is a flow chart of another method for providing a machine-learning-determined reversing indication, in accordance with embodiments of the present disclosure.

FIG. 19 depicts a method 1900 by a telematics device, in accordance with embodiments of the present disclosure. The method 1900 may be performed by telematics device 200_1 of the system of FIG. 17.

At step 1910, an edge reversing determination machine-learning model 290 residing on a telematics device 200_1 is updated. The edge reversing determination machine-learning model 290 is trained using a reversing determination model update 375 received from a central reversing determination machine-learning model 370.

At step 1920, the telematics device 200_1 obtains the captured acceleration data 860 from a three-axis accelerometer 800 of the telematics device 200_1.

At step 1930, the telematics device 200_1 determines, using the edge reversing determination machine-learning model 290, a machine-learning-determined reversing indication 185 from the captured acceleration data 860.

Figure 20:
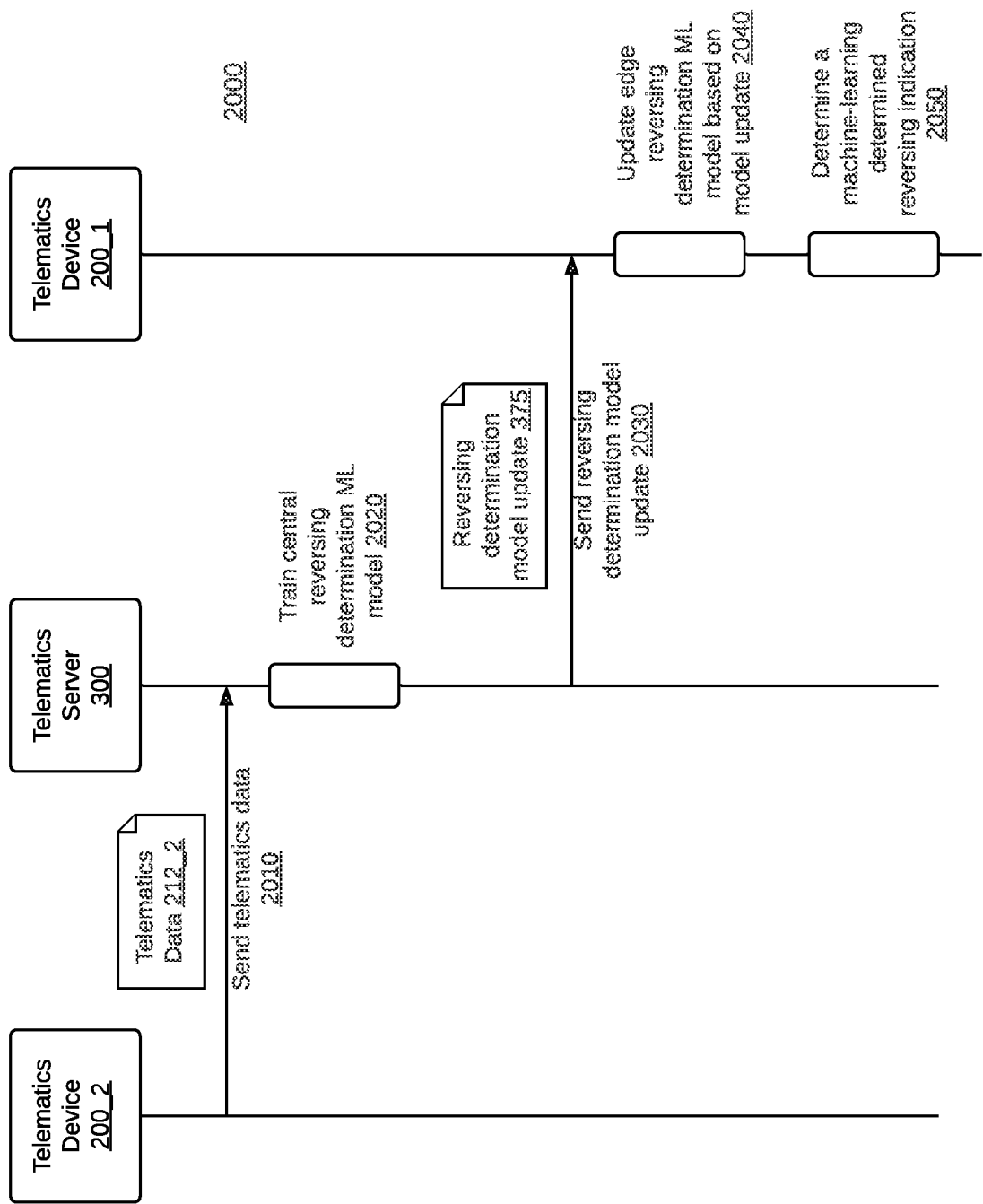
FIG. 20 is a message sequence diagram depicting a method for providing a machine-learning-determined reversing indication, in accordance with embodiments of the present disclosure.

FIG. 20 is a message sequence diagram depicting a method 2000 by the system of FIG. 17, in accordance with embodiments of the present disclosure.

The method starts at step 2010. At step 2010, the telematics device 200-2 sends telematics data 212_2 to the telematics server 300. The telematics data 212_2 is comprised of training acceleration data 850 and a vehicle-provided reversing indication 113, as discussed above. The telematics data 212_2 is received at the telematics server 300.

At step 2020, the telematics server 300 trains the central reversing determination machine-learning model 370 and generates a reversing determination model update 375 using the training acceleration data 850 and the vehicle-provided reversing indication 113 to. As discussed above, the vehicle-provided reversing indication 113 represents a known output label and is used with the training acceleration data 850 corresponding to the vehicle-provided reversing indication 113 to update the model parameters of the central reversing determination machine-learning model 370.

At step 2030, the telematics server 300 sends a reversing determination model update 375 to the telematics device 200_1. The reversing determination model update 375 comprises updated model parameters that were updated in step 2020. In some embodiments, the telematics server 300 periodically sends a reversing determination model update 375 to the telematics device 200_1. In such embodiments, the telematics server 300 notes and stores the date and time that the reversing determination model update 375 was sent to the telematics device 200_1. This enables the telematics server 300 to determine which telematics device has been recently updated and which telematics device has not been recently updated. Accordingly, the telematics server 300 only sends a reversing determination model update to a telematics device 200_1 that has not been updated for a predetermined period of time.

In other embodiments, the telematics server 300 checks the output confidence level of the central reversing determination machine-learning model 370. If, as a result of the training of the central reversing determination machine-learning model 370, the output confidence level of the central reversing determination machine-learning model 370 is improved by a percentage that is above a predetermined output confidence level improvement threshold, then the telematics server 300 sends the reversing determination model update 375 to the telematics device 200_1. In some embodiments, the telematics server 300 notes and stores the output confidence level associated with the reversing determination model update 375 sent to the telematics device 200_1. A reversing determination model update 375 is sent to the telematics device 200_1 if the output confidence level of the central reversing determination machine-learning model 370 is higher than the output confidence level associated with the last instance of the reversing determination model update 375 sent to the telematics device 200_1 by an improvement threshold, such as 5% or 10%.

In other embodiments, the telematics device 200_1 may request a reversing determination model update 375 from the telematics server 300. The request may be made based on the output confidence level of the edge reversing determination machine-learning model 290. For example, if the output confidence level of the edge reversing determination machine-learning model 290 is below 80%, the telematics device 200_1 sends an update request requesting a reversing determination model update 375 from the telematics server 300. In response, the telematics server 300 sends the reversing determination model update 375 to the telematics device 200_1 for updating the model parameters of the edge reversing determination machine-learning model 290.

In all cases, the telematics device 200_1 receives the reversing determination model update 375.

At step 2040, the telematics device 200_1 uses the reversing determination model update 375 to update the model parameters of an edge reversing determination machine-learning model 290.

At step 2050, the telematics device 200_1 uses the edge reversing determination machine-learning model 290 to determine a machine-learning-determined reversing indication 185 based on captured acceleration data 860, as discussed above Advantageously, the method 2000 utilizes an edge reversing determination machine-learning model 290 to determine a machine-learning-determined reversing indication 185. The machine-learning-determined reversing indication 185 is determined in real-time on the telematics device 200_1 and may be used to generate a notification by either the telematics device 200_1 or another device coupled thereto. Additionally, the edge reversing determination machine-learning model 290 is kept simple and does not undergo training by training data. The model training is offloaded to the central reversing determination machine-learning model 370. Advantageously, the telematics device 200_1 is not burdened with the training and does not need to process data from another telematics device 200_2. This is particularly advantageous when the privacy of the telematics data 212_2 is of a concern. The telematics data 212_2 from the telematics device 200_2 is anonymized and only sent to the telematics server 300. The telematics data 212_2 from the telematics device 200_2 is not shared with the telematics device 200_1. In a system such as the one shown in FIG. 17, many telematics devices such as the telematics device 200_2 may provide training data comprising training acceleration data 850 and a vehicle-provided reversing indication 113 as part of the telematics data sent to the telematics server 300. Advantageously, the central reversing determination machine-learning model 370 is trained frequently resulting in a high output confidence level. The high output confidence level attained at the central reversing determination machine-learning model 370 results in a reversing determination model update 375 being sent to one or more telematics device to update an edge reversing determination machine-learning model 290 thereof. This enables the telematics devices to determine a machine-learning-determined reversing indication 185.

The methods described herein may be performed by machine-executable programming instructions stored in non-transitory computer-readable medium and executable by a controller.

It may be apparent to those of skill in the art that features and aspects of the various examples provided above can be combined into further examples that also fall within the scope of the present disclosure. The scope of the claims is not limited by the above examples but should be given the broadest interpretation consistent with the description as a whole.

The invention claimed is:

1. A method, comprising:
  capturing by a first telematics device coupled to a first vehicle:
    a vehicle-provided reversing indication, over an interface port of the first vehicle; and
    training acceleration data, from a 3-axis accelerometer installed in the first telematics device, the training acceleration data representing accelerometer data corresponding to the first vehicle moving in a reverse direction as indicated by the vehicle-provided reversing indication;
  sending, by the first telematics device, to a telematics server, the training acceleration data and the vehicle-provided reversing indication;
  receiving, at the telematics server, the
    training acceleration data and
    the vehicle-provided reversing indication;
  training, by the telematics server, a central reversing determination machine-learning model using the training acceleration data and the vehicle-provided reversing indication as a known output label;
  generating and sending, by the telematics server, a reversing determination model update including updated values of model parameters to a second telematics device coupled to a second vehicle which does not provide a reverse gear indication;
  updating, by the second telematics device, an edge reversing determination machine-learning model using the updated values of model parameters of the reversing determination model update;
  capturing, by the second telematics device, captured acceleration data for the second vehicle from a three-axis accelerometer installed in the second telematics device;
  determining, by the edge reversing determination machine-learning model, a machine-learning-determined reversing indication for the second vehicle based on the captured acceleration data; and sending, by the second telematics device, the machine-learning-determined reversing indication to the telematics server.

2. The method of claim 1, further comprising generating an alert of a reversing event at the second telematics device in response to determining the machine-learning-determined reversing indication.

3. The method of claim 1, wherein the vehicle-provided reversing indication comprises:

a vehicle speed, provided by the first vehicle to the first telematics device, that is greater than about zero, and a reverse gear indication, provided by the first vehicle to the first telematics device.

4. The method of claim 1, wherein sending the reversing determination model update to the second telematics device is done periodically.

5. The method of claim 1, wherein sending the reversing determination model update to the second telematics device is done in response to an improvement in an output confidence level of the central reversing determination machine-learning model.

6. The method of claim 1, wherein sending the reversing determination model update to the second telematics device is done in response to an update request from the second telematics device.

7. The method of claim 1, wherein capturing the captured acceleration data is done in response to a synchronous event on the second telematics device.

8. The method of claim 7, wherein capturing the captured acceleration data comprises copying sampled accelerometer readings from accelerometer First-In-First-Out buffers after the synchronous event.

9. The method of claim 7, wherein capturing the captured acceleration data comprises copying sampled accelerometer readings from accelerometer First-In-First-Out buffers prior to the synchronous event.

10. The method of claim 1, further comprising capturing, at the first telematics device, the training acceleration data from a three-axis accelerometer installed in the first telematics device.

11. The method of claim 1, wherein capturing the training acceleration data is in response to a trigger event.

12. The method of claim 11, wherein capturing pre-trigger event acceleration data comprises copying sampled accelerometer readings from accelerometer First-In-First-Out buffers prior to the trigger event.

13. The method of claim 11, wherein capturing post-trigger event acceleration data comprises copying sampled accelerometer readings from accelerometer First-In-First-Out buffers after the trigger event and before an expiry of a post-trigger duration timer.

14. The method of claim 11, wherein the trigger event comprises the vehicle-provided reversing indication.

15. The method of claim 1, wherein capturing the training acceleration data comprises capturing post-trigger event acceleration data.

16. The method of claim 1, wherein capturing the training acceleration data comprises capturing pre-trigger event acceleration data and post-trigger event acceleration data.

17. The method of claim 1, further comprising sending, by the second telematics device, the machine-learning-determined reversing indication for the second vehicle to the telematics server.

18. The method of claim 1, further comprising logging, by the telematics server, the machine-learning-determined reversing indication for the second vehicle in a telematics database coupled to the telematics server.

19. A telematics system, comprising:

a telematics server running a central reversing determination machine-learning model;

a network;

a first telematics device coupled to a first vehicle and in communication with the telematics server over the network; and a second telematics device coupled to a second vehicle which does not provide a reverse gear indication over the network;

wherein:

the first telematics device captures:

a vehicle-provided reversing indication, over an interface port of the first vehicle; and training acceleration data, from a 3-axis accelerometer installed in the first telematics device, the training acceleration data representing accelerometer data corresponding to the first vehicle moving in a reverse direction as indicated by the vehicle-provided reversing indication;

the first telematics device sends the training acceleration data and the vehicle-provided reversing indication to the telematics server;

the telematics server receives the training acceleration data and the vehicle-provided reversing indication from the first telematics device;

the telematics server trains the central reversing determination machine-learning model and generates a reversing determination model update using the training acceleration data and the vehicle-provided reversing indication as a known output label;

the telematics server sends the reversing determination model update including updated values of model parameters to the second telematics device;

the second telematics device updates an edge reversing determination machine-learning model using updated values of model parameters of the reversing determination model update;

the second telematics device captures captured acceleration data for the second vehicle from a three-axis accelerometer installed in the second telematics device;

the edge reversing determination machine-learning model determines a machine-learning-determined reversing indication for the second vehicle based on the captured acceleration data; and the second telematics device sends the machine-learning-determined reversing indication to the telematics server.

* * * * *